United States Patent
Wang et al.

(10) Patent No.: US 10,948,301 B2
(45) Date of Patent: *Mar. 16, 2021

(54) SYSTEMS AND METHODS FOR RECOMMENDING AN ESTIMATED TIME OF ARRIVAL

(71) Applicant: BEIJING DIDI INFINITY TECHNOLOGY AND DEVELOPMENT CO., LTD., Beijing (CN)

(72) Inventors: Zheng Wang, Beijing (CN); Shujuan Sun, Beijing (CN); Jieping Ye, Tianjin (CN)

(73) Assignee: BEIJING DIDI INFINITY TECHNOLOGY AND DEVELOPMENT CO., LTD., Beijing (CN)

( * ) Notice: Subject to any disclaimer, the term of this patent is extended or adjusted under 35 U.S.C. 154(b) by 32 days.

This patent is subject to a terminal disclaimer.

(21) Appl. No.: 16/288,168

(22) Filed: Feb. 28, 2019

(65) Prior Publication Data

US 2019/0257658 A1 Aug. 22, 2019

Related U.S. Application Data

(63) Continuation of application No. 15/980,643, filed on May 15, 2018, now Pat. No. 10,254,119, which is a
(Continued)

(30) Foreign Application Priority Data

Apr. 18, 2016 (CN) .......................... 201610242067.5

(51) Int. Cl.
*G01C 21/26* (2006.01)
*G06Q 10/04* (2012.01)
(Continued)

(52) U.S. Cl.
CPC ......... *G01C 21/26* (2013.01); *G01C 21/3446* (2013.01); *G06F 3/00* (2013.01);
(Continued)

(58) Field of Classification Search
CPC .... G01C 21/26; G01C 21/34; G01C 21/3446; G06F 3/00; G06Q 10/04; G06Q 10/06;
(Continued)

(56) References Cited

U.S. PATENT DOCUMENTS 6,317,686 B1  11/2001  Ran
9,037,405 B2   5/2015  Gourlay et al.
(Continued)

FOREIGN PATENT DOCUMENTS

CN    1484206 A    3/2004
CN  101388143 A    3/2009
(Continued)

OTHER PUBLICATIONS

International Search Report in PCT/CN2017/080850 dated Jul. 25, 2017, 5 pages.
(Continued)

*Primary Examiner* — Mary Cheung
(74) *Attorney, Agent, or Firm* — Metis IP LLC

(57) ABSTRACT

The present disclosure relates to systems and methods for determining an estimated time of arrival (ETA) for a route, based on a model of ETA. The systems may perform the methods to obtain a first electrical signal associated with at least one route having at least one road section; generate and save first structured data of at least one global feature vector and at least one historical duration associated with the at least one route based on the first electrical signal; generate second structured data of a model of ETA by training the model based on the at least one global feature vector and the at least one historical duration; and save the second struc-
(Continued)

tured data of the model of ETA in the at least one non-transitory computer-readable storage medium.

20 Claims, 11 Drawing Sheets

Related U.S. Application Data continuation of application No. PCT/CN2017/080850, filed on Apr. 18, 2017.

(51) Int. Cl.
| | |
|---|---|
| *G06Q 10/06* | (2012.01) |
| *G06Q 50/30* | (2012.01) |
| *G08G 1/01* | (2006.01) |
| *H04W 4/029* | (2018.01) |
| *G01C 21/34* | (2006.01) |
| *G06F 3/00* | (2006.01) |
| *G08G 1/00* | (2006.01) |
| *G08G 1/0968* | (2006.01) |

(52) U.S. Cl.
CPC ............ *G06Q 10/04* (2013.01); *G06Q 10/06* (2013.01); *G06Q 50/30* (2013.01); *G08G 1/012* (2013.01); *G08G 1/0112* (2013.01); *G08G 1/0129* (2013.01); *G08G 1/0141* (2013.01); *H04W 4/029* (2018.02); *G08G 1/0968* (2013.01); *G08G 1/202* (2013.01)

(58) Field of Classification Search
CPC ...... G06Q 50/30; G08G 1/0112; G08G 1/012; G08G 1/0129; G08G 1/0141; G08G 1/0968; G08G 1/202; H04W 4/029; H04W 4/02
See application file for complete search history.

(56) References Cited

U.S. PATENT DOCUMENTS

| | | | |
|---|---|---|---|
| 9,239,989 | B2 | 1/2016 | Bouqata et al. |
| 10,254,119 | B2 | 4/2019 | Wang et al. |
| 2006/0074551 | A1* | 4/2006 | Zaitsu ............ G08G 1/096844 701/117 |
| 2008/0059057 | A1* | 3/2008 | Tengler ............ G01C 21/3626 701/465 |
| 2008/0097686 | A1 | 4/2008 | Takeuchi et al. |
| 2010/0217519 | A1 | 8/2010 | Englerth et al. |
| 2010/0262362 | A1* | 10/2010 | Naito ............... G08G 1/096866 701/424 |
| 2011/0161261 | A1 | 6/2011 | Wu et al. |
| 2014/0058652 | A1 | 2/2014 | Duan et al. |
| 2014/0279662 | A1 | 9/2014 | Wang et al. |
| 2015/0168169 | A1 | 6/2015 | Caceres et al. |
| 2015/0268056 | A1 | 9/2015 | Gueziee |
| 2016/0196527 | A1 | 7/2016 | Bose et al. |
| 2017/0270790 | A1* | 9/2017 | Neiger ................ G08G 1/127 |

FOREIGN PATENT DOCUMENTS

| | | |
|---|---|---|
| CN | 101706888 A | 5/2010 |
| CN | 103377552 A | 10/2013 |
| CN | 102081859 B | 10/2014 |
| CN | 104123841 A | 10/2014 |
| CN | 104346926 A | 2/2015 |
| CN | 104794927 A | 7/2015 |
| CN | 104882020 A | 9/2015 |
| EP | 2854117 A1 | 4/2015 |
| JP | 2003296891 A | 10/2003 |
| JP | 2006134158 A | 5/2006 |
| TW | 201531995 A | 8/2015 |
| WO | 0063866 A1 | 10/2000 |

OTHER PUBLICATIONS

Written Opinion in PCT/CN2017/080850 dated Jul. 25, 2017, 4 pages.
The Extended European Search Report in Europen Application No. 17785416.3 dated Oct. 2, 2018, 8 pages.
Notice of Reasons for Rejection in Japanese Application No. 2018524227 dated Sep. 10, 2019, 12 pages.
Written Opinion and Search Report in Singaporean Application No. 11201804005W dated Oct. 28, 2019, 7 pages.

* cited by examiner

SYSTEMS AND METHODS FOR RECOMMENDING AN ESTIMATED TIME OF ARRIVAL

CROSS-REFERENCE TO RELATED APPLICATIONS

This application is a continuation of U.S. patent application Ser. No. 15/980,643, filed on May 15, 2018, which is a continuation of International Application No. PCT/CN2017/080850, filed on Apr. 18, 2017, which designates the United States of America and claims priority to Chinese Application No. 201610242067.5, filed on Apr. 18, 2016, the contents of which are incorporated herein by reference.

TECHNICAL FIELD

The present disclosure generally relates to systems and methods for determining an estimated time of arrival (ETA) for a route, and in particular, systems and methods for determining the ETA using a model of ETA.

BACKGROUND

With the development of Internet technology, on-demand services, such as online taxi hailing services and delivery services, play a significant role in people's daily life. For example, on-demand transportation service for a transportation may heavily be used by a user (e.g., a passenger). Through an online on-demand service platform, the user may request an on-demand service in the form of an on-demand service through an application installed in a user equipment, such as a smartphone terminal.

SUMMARY

According to an aspect of the present disclosure, a system may include at least one non-transitory computer-readable storage medium and at least one processor of an online on-demand service platform from a requestor terminal configured to communicate with the at least one non-transitory computer-readable storage medium. The at least one non-transitory computer-readable storage medium may include a set of instructions for determining an estimated time of arrival (ETA) for an intended route. When the at least one processor executing the set of instructions, the at least one processor may be directed to perform one or more of the following operations. The at least one processor may obtain a first electrical signal associated with at least one route having at least one road section. The at least one processor may generate and save first structured data of at least one global feature vector and at least one historical duration associated with the at least one route based on the first electrical signal. The at least one processor may generate second structured data of a model of ETA by training the model based on the at least one global feature vector and the at least one historical duration. The at least one processor may save the second structured data of the model of ETA in the at least one non-transitory computer-readable storage medium.

According to a further aspect of the present disclosure, a method may include one or more of the following operations. At least one computer server of an online on-demand service platform from a requestor terminal may obtain a first electrical signal associated with at least one route having at least one road section. The at least one computer server may generate and save first structured data of at least one global feature vector and at least one historical duration associated with the at least one route based on the first electrical signal. The at least one computer server may generate second structured data of a model of ETA by training the model based on the at least one global feature vector and the at least one historical duration. The at least one computer server may save the second structured data of the model of ETA in at least one non-transitory computer-readable storage medium.

According to another aspect of the present disclosure, a non-transitory machine-readable storage medium may include instructions. When the non-transitory machine-readable storage medium accessed by at least one processor of an online on-demand service platform from a requestor terminal, the instructions may cause the at least one processor to perform one or more of the following operations. The instructions may cause the at least one processor to obtain a request of an on-demand service including a current default service location through a wireless network. The instructions may cause the at least one processor to obtain a first electrical signal associated with at least one route having at least one road section. The instructions may cause the at least one processor to generate and save first structured data of at least one global feature vector and at least one historical duration associated with the at least one route based on the first electrical signal. The instructions may cause the at least one processor to generate second structured data of a model of ETA by training the model based on the at least one global feature vector and the at least one historical duration. The instructions may cause the at least one processor to save the second structured data of the model of ETA in the non-transitory computer-readable storage medium.

BRIEF DESCRIPTION OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein.

DETAILED DESCRIPTION

Figure 1:
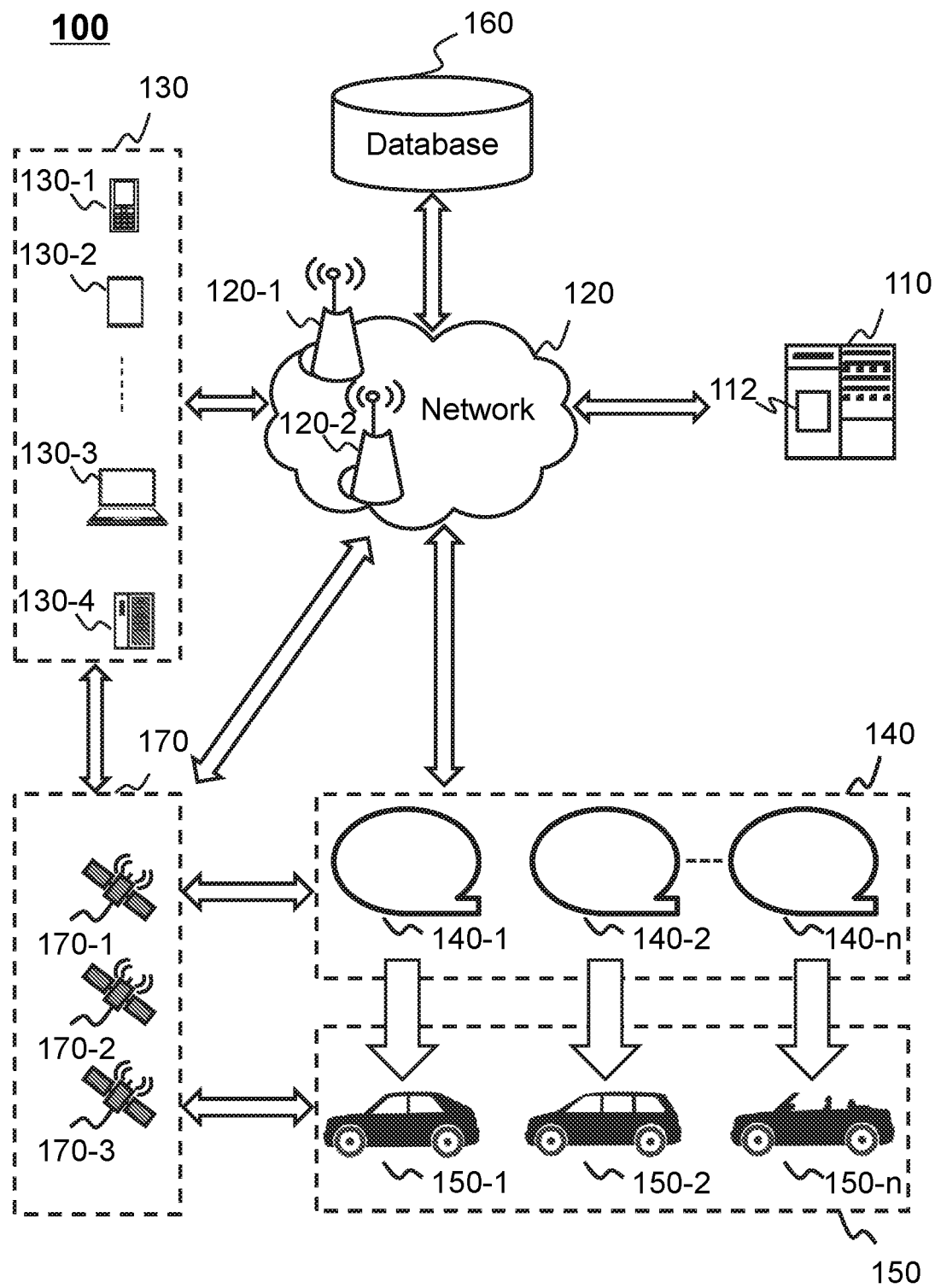
FIG. 1 is a block diagram illustrating an exemplary on-demand service system according to some embodiments of the present disclosure.

The following description is presented to enable any person skilled in the art to make and use the present disclosure, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but is to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure. It is understood that the drawings are not to scale.

The flowcharts used in the present disclosure illustrate operations that systems implement according to some embodiments in the present disclosure. It is to be expressly understood, the operations of the flowchart may be implemented not in order. Conversely, the operations may be implemented in inverted order, or simultaneously. Moreover, one or more other operations may be added to the flowcharts. One or more operations may be removed from the flowcharts.

Moreover, while the system and method in the present disclosure is described primarily in regard to distributing a request for a transportation service, it should also be understood that the present disclosure is not intended to be limiting. The system or method of the present disclosure may be applied to any other kind of on demand service. For example, the system or method of the present disclosure may be applied to transportation systems of different environments including land, ocean, aerospace, or the like, or any combination thereof. The vehicle of the transportation systems may include a taxi, a private car, a hitch, a bus, a train, a bullet train, a high speed rail, a subway, a vessel, an aircraft, a spaceship, a hot-air balloon, a driverless vehicle, or the like, or any combination thereof. The transportation system may also include any transportation system for management and/or distribution, for example, a system for sending and/or receiving an express. The application of the system or method of the present disclosure may be implemented on a user device and include a webpage, a plug-in of a browser, a client terminal, a custom system, an internal analysis system, an artificial intelligence robot, or the like, or any combination thereof.

The term "passenger," "requestor," "service requestor," and "customer" in the present disclosure are used interchangeably to refer to an individual, an entity, or a tool that may request or order a service. Also, the term "driver," "provider," and "service provider" in the present disclosure are used interchangeably to refer to an individual, an entity, or a tool that may provide a service or facilitate the providing of the service.

The term "service request," "request for a service," "requests," and "order" in the present disclosure are used interchangeably to refer to a request that may be initiated by a passenger, a service requestor, a customer, a driver, a provider, a service provider, or the like, or any combination thereof. The service request may be accepted by any one of a passenger, a service requestor, a customer, a driver, a provider, or a service provider. The service request may be chargeable or free.

The term "service provider terminal" and "driver terminal" in the present disclosure are used interchangeably to refer to a mobile terminal that is used by a service provider to provide a service or facilitate the providing of the service. The term "service requestor terminal" and "passenger terminal" in the present disclosure are used interchangeably to refer to a mobile terminal that is used by a service requestor to request or order a service.

The positioning technology used in the present disclosure may be based on a global positioning system (GPS), a global navigation satellite system (GLONASS), a compass navigation system (COMPASS), a Galileo positioning system, a quasi-zenith satellite system (QZSS), a wireless fidelity (WiFi) positioning technology, or the like, or any combination thereof. One or more of the above positioning systems may be used interchangeably in the present disclosure.

An aspect of the present disclosure relates to online systems and methods for determining an estimated time of arrival (ETA) for a route, based on a model of ETA. The systems and methods take a route that includes at least one road section as a whole, and obtain a global feature vector thereof. As a result, the global features no only include features of each individual road sections, but also embraces interaction relations between different road sections, adjacent or not adjacent. After obtaining the global feature vectors of a plurality of routes, the systems and methods may train the ETA model by the global feature vector of the plurality of routes and historical travel durations that vehicles took to travel through the plurality of routes. The trained ETA model then may be used to determine ETA of an actual driver.

It should be noted that the online on-demand transportation service, such as online taxi hailing, is a newly emerged service rooted in post-Internet era. It provides the technical solutions to the passengers and drivers that could raise in post-Internet era. In the pre-Internet era, when a passenger hails a taxi, the passenger may have no knowledge of an estimated time of arrival to a destination or location. If the passenger hails a taxi through a telephone call, it may be difficult for the service provider (e.g., a driver, a taxi company, a post office, a delivery company, or an agent, etc.) to estimate a time arriving the destination for the passenger. Online on-demand transportation system, however, may determine an estimated time of arrival for the passenger based on a model of ETA and an intended feature vector obtaining from an intended route. By training the global feature vector and the historical duration, the online on-demand transportation system may provide the model of ETA or a sub-model of ETA for the intended route. A user such as a passenger or a driver may use the model of ETA or the sub-model of ETA to predict the ETA before confirming a service request for a transportation service (e.g., hailing a taxi). The global feature vector for training the model of ETA or the sub-model of ETA may be obtained from electrical signal associated with at least one road section. Therefore, through Internet, the online on-demand transportation systems may provide a much more convenient and efficient transaction platform for the passengers and the drivers that may never be met in a traditional pre-Internet transportation service system.

FIG. 1 is a block diagram illustrating an exemplary on-demand service system 100 according to some embodiments. For example, the on-demand service system 100 may be an online transportation service platform for transportation services. The on-demand service system 100 may include a server 110, a network 120, a service requestor terminal 130, a service provider terminal 140, a vehicle 150, a database 160, and a navigation system 170.

The on-demand service system 100 may provide a plurality of services. Exemplary service may include a taxi hailing service, a chauffeur service, an express car service, a carpool service, a bus service, a driver hire service, and a shuttle service. In some embodiments, the on-demand service may be any on-line service, such as booking a meal, shopping, or the like, or any combination thereof.

In some embodiments, the server 110 may be a single server, or a server group. The server group may be centralized, or distributed (e.g., the server 110 may be a distributed system). In some embodiments, the server 110 may be local or remote. For example, the server 110 may access information and/or data stored in the service requestor terminal 130, the service provider terminal 140, and/or the database 160 via the network 120. As another example, the server 110 may be directly connected to the service requestor terminal 130, the service provider terminal 140, and/or the database 160 to access stored information and/or data. In some embodiments, the server 110 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof. In some embodiments, the server 110 may be implemented on a computing device 1000 having one or more components illustrated in FIG. 10 in the present disclosure.

In some embodiments, the server 110 may include a processing engine 112. The processing engine 112 may process information and/or data related to the service request to perform one or more functions described in the present disclosure. For example, the processing engine 112 may determine one or more candidate service provider terminals in response to the service request received from the service requestor terminal 130. In some embodiments, the processing engine 112 may include one or more processing engines (e.g., single-core processing engine(s) or multi-core processor(s)). Merely by way of example, the processing engine 112 may include a central processing unit (CPU), an application-specific integrated circuit (ASIC), an application-specific instruction-set processor (ASIP), a graphics processing unit (GPU), a physics processing unit (PPU), a digital signal processor (DSP), a field programmable gate array (FPGA), a programmable logic device (PLD), a controller, a microcontroller unit, a reduced instruction-set computer (RISC), a microprocessor, or the like, or any combination thereof.

The network 120 may facilitate exchange of information and/or data. In some embodiments, one or more components in the on-demand service system 100 (e.g., the server 110, the service requestor terminal 130, the service provider terminal 140, the vehicle 150, the database 160, and the navigation system 170) may send information and/or data to other component(s) in the on-demand service system 100 via the network 120. For example, the server 110 may receive a service request from the service requestor terminal 130 via the network 120. In some embodiments, the network 120 may be any type of wired or wireless network, or combination thereof. Merely by way of example, the network 120 may include a cable network, a wireline network, an optical fiber network, a tele communications network, an intranet, an Internet, a local area network (LAN), a wide area network (WAN), a wireless local area network (WLAN), a metropolitan area network (MAN), a wide area network (WAN), a public telephone switched network (PSTN), a Bluetooth network, a ZigBee network, a near field communication (NFC) network, or the like, or any combination thereof. In some embodiments, the network 120 may include one or more network access points. For example, the network 120 may include wired or wireless network access points such as base stations and/or internet exchange points 120-1, 120-2, . . . , through which one or more components of the on-demand service system 100 may be connected to the network 120 to exchange data and/or information.

In some embodiments, a passenger may be an owner of the service requestor terminal 130. In some embodiments, the owner of the service requestor terminal 130 may be someone other than the passenger. For example, an owner A of the service requestor terminal 130 may use the service requestor terminal 130 to send a service request for a passenger B, or receive a service confirmation and/or information or instructions from the server 110. In some embodiments, a service provider may be a user of the service provider terminal 140. In some embodiments, the user of the service provider terminal 140 may be someone other than the service provider. For example, a user C of the service provider terminal 140 may use the service provider terminal 140 to receive a service request for a service provider D, and/or information or instructions from the server 110. In some embodiments, "passenger" and "passenger terminal" may be used interchangeably, and "service provider" and "service provider terminal" may be used interchangeably. In some embodiments, the service provider terminal may be associated with one or more service providers (e.g., a night-shift service provider, or a day-shift service provider).

In some embodiments, the service requestor terminal 130 may include a mobile device 130-1, a tablet computer 130-2, a laptop computer 130-3, a built-in device in a vehicle 130-4, or the like, or any combination thereof. In some embodiments, the mobile device 130-1 may include a smart home device, a wearable device, a smart mobile device, a virtual reality device, an augmented reality device, or the like, or any combination thereof. In some embodiments, the smart home device may include a smart lighting device, a control device of an intelligent electrical apparatus, a smart monitoring device, a smart television, a smart video camera, an interphone, or the like, or any combination thereof. In some embodiments, the wearable device may include a smart bracelet, a smart footgear, a smart glass, a smart helmet, a smart watch, smart clothing, a smart backpack, a smart accessory, or the like, or any combination thereof. In some embodiments, the smart mobile device may include a smartphone, a personal digital assistance (PDA), a gaming device, a navigation device, a point of sale (POS) device, or the like, or any combination thereof. In some embodiments, the virtual reality device and/or the augmented reality device may include a virtual reality helmet, a virtual reality glass, a virtual reality patch, an augmented reality helmet, an augmented reality glass, an augmented reality patch, or the like, or any combination thereof. For example, the virtual reality device and/or the augmented reality device may include a Google™ Glass, an Oculus Rift, a HoloLens, a Gear VR, etc. In some embodiments, built-in device in the vehicle 130-4 may include an onboard computer, an onboard television, etc. In some embodiments, the service requestor terminal 130 may be a device with positioning technology for locating the position of the passenger and/or the service requestor terminal 130.

The service provider terminal 140 may include a plurality of service provider terminals 140-1, 140-2, . . . , 140-n. In some embodiments, the service provider terminal 140 may be similar to, or the same device as the service requestor terminal 130. In some embodiments, the service provider terminal 140 may be customized to be able to implement the online on-demand transportation service. In some embodiments, the service provider terminal 140 may be a device with positioning technology for locating the service provider, the service provider terminal 140, and/or a vehicle 150 associated with the service provider terminal 140. In some embodiments, the service requestor terminal 130 and/or the service provider terminal 140 may communicate with other positioning device to determine the position of the passenger, the service requestor terminal 130, the service provider, and/or the service provider terminal 140. In some embodiments, the service requestor terminal 130 and/or the service provider terminal 140 may periodically send the positioning information to the server 110. In some embodiments, the service provider terminal 140 may also periodically send the availability status to the server 110. The availability status may indicate whether a vehicle 150 associated with the service provider terminal 140 is available to carry a passenger. For example, the service requestor terminal 130 and/or the service provider terminal 140 may send the positioning information and the availability status to the server 110 every thirty minutes. As another example, the service requestor terminal 130 and/or the service provider terminal 140 may send the positioning information and the availability status to the server 110 each time the user logs into the mobile application associated with the online on-demand transportation service.

In some embodiments, the service provider terminal 140 may correspond to one or more vehicles 150. The vehicles 150 may carry the passenger and travel to the destination. The vehicles 150 may include a plurality of vehicles 150-1, 150-2, . . . , 150-n. One vehicle may correspond to one type of services (e.g., a taxi hailing service, a chauffeur service, an express car service, a carpool service, a bus service, a driver hire service, and a shuttle service).

The database 160 may store data and/or instructions. In some embodiments, the database 160 may store data obtained from the service requestor terminal 130 and/or the service provider terminal 140. In some embodiments, the database 160 may store data and/or instructions that the server 110 may execute or use to perform exemplary methods described in the present disclosure. In some embodiments, database 160 may include a mass storage, a removable storage, a volatile read-and-write memory, a read-only memory (ROM), or the like, or any combination thereof. Exemplary mass storage may include a magnetic disk, an optical disk, a solid-state drives, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyristor RAM (T-RAM), and a zero-capacitor RAM (Z-RAM), etc. Exemplary ROM may include a mask ROM (MROM), a programmable ROM (PROM), an erasable programmable ROM (PEROM), an electrically erasable programmable ROM (EEPROM), a compact disk ROM (CD-ROM), and a digital versatile disk ROM, etc. In some embodiments, the database 160 may be implemented on a cloud platform. Merely by way of example, the cloud platform may include a private cloud, a public cloud, a hybrid cloud, a community cloud, a distributed cloud, an inter-cloud, a multi-cloud, or the like, or any combination thereof.

In some embodiments, the database 160 may be connected to the network 120 to communicate with one or more components in the on-demand service system 100 (e.g., the server 110, the service requestor terminal 130, the service provider terminal 140, etc.). One or more components in the on-demand service system 100 may access the data or instructions stored in the database 160 via the network 120. In some embodiments, the database 160 may be directly connected to or communicate with one or more components in the on-demand service system 100 (e.g., the server 110, the service requestor terminal 130, the service provider terminal 140, etc.). In some embodiments, the database 160 may be part of the server 110.

The navigation system 170 may determine information associated with an object, for example, one or more of the service requestor terminal 130, the service provider terminal 140, the vehicle 150, etc. In some embodiments, the navigation system 170 may be a global positioning system (GPS), a global navigation satellite system (GLONASS), a compass navigation system (COMPASS), a BeiDou navigation satellite system, a Galileo positioning system, a quasi-zenith satellite system (QZSS), etc. The information may include a location, an elevation, a velocity, or an acceleration of the object, or a current time. The navigation system 170 may include one or more satellites, for example, a satellite 170-1, a satellite 170-2, and a satellite 170-3. The satellites 170-1 through 170-3 may determine the information mentioned above independently or jointly. The satellite navigation system 170 may send the information mentioned above to the network 120, the service requestor terminal 130, the service provider terminal 140, or the vehicle 150 via wireless connections.

In some embodiments, one or more components in the on-demand service system 100 (e.g., the server 110, the service requestor terminal 130, the service provider terminal 140, etc.) may have permissions to access the database 160. In some embodiments, one or more components in the on-demand service system 100 may read and/or modify information related to the passenger, service provider, and/or the public when one or more conditions are met. For example, the server 110 may read and/or modify one or more passengers' information after a service is completed. As another example, the server 110 may read and/or modify one or more service providers' information after a service is completed.

In some embodiments, information exchanging of one or more components in the on-demand service system 100 may be initiated by way of requesting a service. The object of the service request may be any product. In some embodiments, the product may include food, medicine, commodity, chemical product, electrical appliance, clothing, car, housing, luxury, or the like, or any combination thereof. In some other embodiments, the product may include a servicing product, a financial product, a knowledge product, an internet product, or the like, or any combination thereof. The internet product may include an individual host product, a web product, a mobile internet product, a commercial host product, an embedded product, or the like, or any combination thereof. The mobile internet product may be used in a software of a mobile terminal, a program, a system, or the like, or any combination thereof. The mobile terminal may include a tablet computer, a laptop computer, a mobile phone, a personal digital assistance (PDA), a smart watch, a point of sale (POS) device, an onboard computer, an onboard television, a wearable device, or the like, or any combination thereof. For example, the product may be any software and/or application used in the computer or mobile phone. The software and/or application may relate to socializing, shopping, transporting, entertainment, learning, investment, or the like, or any combination thereof. In some embodiments, the software and/or application related to transporting may include a traveling software and/or application, a vehicle scheduling software and/or application, a mapping software and/or application, etc. In the vehicle scheduling software and/or application, the vehicle may include a horse, a carriage, a rickshaw (e.g., a wheelbarrow, a bike, a tricycle, etc.), a car (e.g., a taxi, a bus, a private car, etc.), a train, a subway, a vessel, an aircraft (e.g., an airplane, a helicopter, a space shuttle, a rocket, a hot-air balloon, etc.), or the like, or any combination thereof.

One of ordinary skill in the art would understand that when an element of the on-demand service system 100 performs, the element may perform through electrical signals and/or electromagnetic signals. For example, when a service requestor terminal 130 sends out a service request to the server 110, a processor of the service requestor terminal 130 may generate an electrical signal encoding the request. The processor of the service requestor terminal 130 may then send the electrical signal to an output port. If the service requestor terminal 130 communicates with the server 110 via a wired network, the output port may be physically connected to a cable, which further transmit the electrical signal to an input port of the server 110. If the service requestor terminal 130 communicates with the server 110 via a wireless network, the output port of the service requestor terminal 130 may be one or more antennas, which convert the electrical signal to electromagnetic signal. Similarly, a service provider terminal 130 may receive an instruction and/or service request from the server 110 via electrical signal or electromagnet signals. Within an electronic device, such as the service requestor terminal 130, the service provider terminal 140, and/or the server 110, when a processor thereof processes an instruction, sends out an instruction, and/or performs an action, the instruction and/or action is conducted via electrical signals. For example, when the processor retrieves or saves data from a storage medium, it may send out electrical signals to a read/write device of the storage medium, which may read or write structured data in the storage medium. The structured data may be transmitted to the processor in the form of electrical signals via a bus of the electronic device. Here, an electrical signal may refer to one electrical signal, a series of electrical signals, and/or a plurality of discrete electrical signals.

Figure 2:
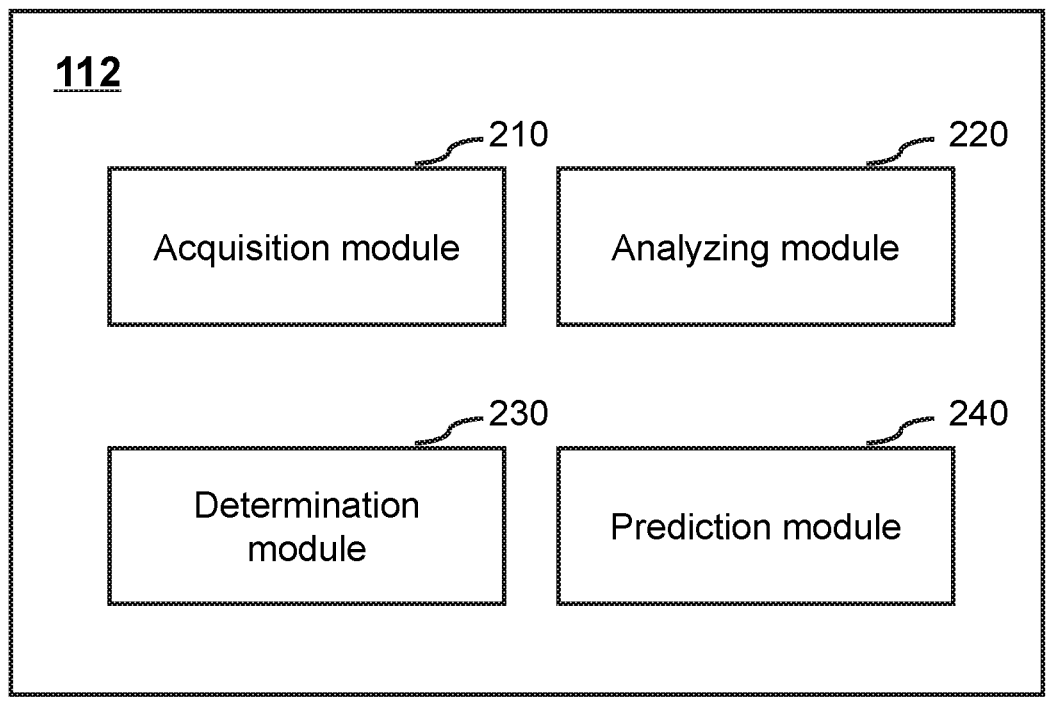
FIG. 2 is a block diagram illustrating an exemplary processing engine according to some embodiments of the present disclosure.

FIG. 2 is a block diagram illustrating an exemplary processing engine 112 according to some embodiments of the present disclosure. The processing engine 112 may include an acquisition module 210, an analyzing module 220, a determination module 230, and a prediction module 240. Each module may be a hardware circuit that is designed to perform the following actions, a set of instructions stored in one or more storage media, and/or any combination of the hardware circuit and the one or more storage media.

The acquisition module 210 may be configured to obtain road-related data associated with a route (or routes) from the online on-demand service system 100. In some embodiments, the road-related data by be transmitted as electrical signal. For example, the road-related data may be substituted by or equivalent to electrical signal or electrical signal encoding road-related data as described elsewhere in the present disclosure. The route may correspond to a transportation service or goods delivery service. The transportation service may include a taxi hailing service, chauffeur service, express car service, carpool service, bus service, short-term driver-renting service, shuttle service, or the like, or any combination thereof. The route may be generated by at least one user terminal or a server of an online on-demand transportation platform, such as the system 100. The at least one user terminal may be associated with at least one service provider, such as a driver, or service requestor, such as a passenger. For example, after sending a request for a transportation service, a passenger terminal may generate or obtain from the platform a route in a map for the transportation service. In some embodiments, the route may be recorded and/or stored in the online on-demand service system 100. For example, during a transportation service, the online on-demand service system 100 may record any information related to the route via the network 120 and store the information in the database 160 or any component in the online on-demand service system 100.

In some embodiments, the acquisition module 210 may acquire road-related data associated with a plurality of routes in the on-demand service system 100. For example, the acquisition module 210 may acquire the plurality of routes generated in the last 6 months in the on-demand service platform for carpool service. In some embodiments, the plurality of routes may further be divided into different clusters. For example, the routes may be divided based on types of vehicles, types of services, areas of the routes, or time interval of the routes. The types of vehicles may include private cars, taxis, trucks, motorcycle, autonomous vehicles, electric cars, bicycle, or the like, or any combination thereof. The types of services may include cargo services, post services, food order services, bus services, hitchhiking services, special car services, express car services, vehicle rent services, driving services, chauffeur, or the like, or any combination thereof. The areas of the routes may be geographical locations and/or administrative districts in a map that at least part of the routes locate in. The time interval of the routes may be a time period that a starting time and/or an ending time of the route belongs to. Merely by way of example, one day (from 0 a.m. to 24 p.m.) may be divided into a plurality of time intervals. Merely by way of example, the time intervals may include 0 a.m. to 2 a.m., 2 a.m. to 4 a.m., . . . , 23 p.m. to 24 p.m. In some embodiments, the time intervals may be determined according to other information including, for example, vacation, workday, rush time, the weather, or the like, or any combination thereof. When the starting time or the ending time of the route belongs to one time interval (e.g., 8 a.m. to 10. a.m.), the route may belong to this time interval (e.g., 8. a.m. to 10 a.m.) correspondingly. In some embodiments, one route may belong to one time interval. In some other embodiments, one route may belong to at least two time intervals.

The analyzing module 220 may be configured to determine a global feature vector and a historical travel duration of a route.

A global feature vector may be a mathematical expression (e.g., a vector) to describe characteristics of a route as a whole. For example, the route may include at least one road section. The global feature vector may include not only features of individual sections in the route, but also features that reflects interactions between different individual sections.

In some embodiments, the global feature vector may be a vector with one single column or one single row. The global feature vector may correspond to an N-dimensional coordinate system. Each dimension may be associated to one item or feature of the route. In some embodiments, the global feature vector may include a relationship between at least two of the at least one road section. In some embodiments, the item or feature of the global feature vector may exclude the route's interaction relation with other route. For example, the global feature vector may be determined according to one single route. In some embodiments, the item or feature of the global feature vector may include interaction relations between different routes. For example, the global feature vector of a target route may be determined according to two or more routes (e.g., hundreds of routes, millions of routes, or billions of routs, etc.) of which the road condition may affect that of the target route. The global feature vector may be further analyzed by the analyzing module 220 or be used to establish a training set including a plurality of training examples. The training set may be used to train or establish a model in the determination module 230 by using, for example, a machine learning method.

In some embodiments, the global feature vector may include a plurality of items or features (e.g., a few millions of items or features) including, for example, traffic status, driving distance, starting time, starting location, destination location, sequence of satellite positioning sampling points, driving distance on a specified level of road, number of road sections, number of crossroads with traffic lights, number of crossroads without traffic lights, vehicle status, or the like, or any combination thereof. The traffic status may include a real-time road speed, or an estimated road speed. The driving distance may include total distance of the route, or distance in each of the road sections. The starting time may include a time that a passenger has been picked up, or a time that a user (e.g., a driver) has receive or confirm a service request. The starting location may be a location where a passenger was picked up, or a location for a passenger to wait a driver. The sequence of satellite positioning sampling points may be a sequence including vehicle positions that may be determined by a satellite (e.g., via a GPS system). The driving distance on a specified level of road may be a distance that a vehicle drives on a specified level of road, such as a highway, a local road, a first-class road, a second-class road, a third-class road etc. The number of road sections may be a total number of the road sections in one route. The vehicle status may include an access status (e.g., availability to accept the service request.) to the transportation service request, a response probability, a preference of a driver, a vehicle type, a current number of passengers in the vehicle, a maximum passenger capacity of the vehicle, a color of the vehicle, a service level of the driver, a current speed of the vehicle, or any information relative to the vehicle, or the like, or any combination thereof.

In some embodiments, the global feature vector may be determined based on, or at least in part, information from another system (e.g., a weather forecasting system, a traffic guidance system, or a traffic radio system, etc.). The off-line information may include weather condition, traffic accident information, traffic congestion condition, traffic restriction, or any information related to the route. The weather condition may include real-time weather information, substantially real-time weather information, weather forecast information, etc. The processing engine 112 may obtain the information from the database 160, a weather condition platform (e.g., a weather forecast website), a traffic guidance platform, and/or any other device that can provide these information, to determine the global feature vector. For example, the global feature vector may be determined based on the data associated with the route and the weather condition related to the route.

In some embodiments, the historical travel duration of a route (e.g., "historical duration") may be the historical travel records occurred on the route, e.g., the recorded overall time of each vehicle that drove through the route (from a starting location to an ending location or destination). In some embodiments, the overall time may further include, for example, walking time, cycling time, riding time, driving time, flight time, shipping time, or the like, or any combination thereof.

In some embodiments, the analyzing module 220 may generate and save structure data of global feature vector and historical duration associated with the route. The structured data may be constructed or retrieved based on a B-tree, or a hash table.

The determination module 230 may be configured to determine structured data of a model of estimated time of arrival (ETA) based on the global feature vector and the historical duration. The model of ETA may be used to predict an ETA. In some embodiments, the model of ETA may be stored as an application, which may be used in a user terminal (e.g., a driver terminal) or an online platform (e.g., a website). For example, the model of ETA may be send to a smartphone that may be used as a driver terminal for the transportation service, and the driver may log in the application for predicting the ETA from one location to another location. As another example, the model may be stored in the online on-demand service system 100 (e.g., the database 160), and a passenger may download or use the model of ETA on line via the network 120 or a wired connection. In some embodiments, the model of ETA may be stored in a storage medium. For example, the model of ETA may be stored in a non-transitory computer-readable storage medium (e.g., a universal serial bus flash disk), which may be used by online on-demand service system 100 or a user terminal (e.g., a passenger terminal).

In some embodiments, the model of ETA may be installed in another system in order to predict the ETA. For example, the model of ETA may be installed in a video game system for car racing to predict the ETA. As another example, the model of ETA may be applied in a toy car controlling system in a gamepad for determining the ETA of the toy car. As still another example, the model of ETA may further be used in a driving simulator to train a racing driver or an astronaut in the driving simulator. As still another example, the model of ETA may be used in a public cloud, and a user that may an access to the public cloud may use the model of ETA.

The prediction module 240 may be configured to determine an ETA for a second electrical signal encoding road-related data associated with an intended route having at least one road section. The ETA for the intended route may be used to definite a time duration from a starting location to an ending location of the intended route. For example, the ETA for the intended route between the starting location and the ending location may be predicted as 5 minutes, 2 hours, or 1 day, etc.

In some embodiments, the ETA may be determined dynamically. For example, the ETA may be dynamically adjusted based on a weather condition (e.g., a haze or a thundershower) or traffic accident information. As another example, the ETA may be dynamically adjusted when a vehicle changes its driving modes. For example, a vehicle may include at least two modes of no automation mode, driver assistance mode, partial automation mode, conditional automation mode, high automation mode, and full automation mode. The ETA may be dynamically adjusted when the vehicle switch from one of these modes to another.

The modules in the processing engine 112 may be connected to or communicate with each other via a wired connection or a wireless connection. The wired connection may include a metal cable, an optical cable, a hybrid cable, or the like, or any combination thereof. The wireless connection may include a Local Area Network (LAN), a Wide Area Network (WAN), a Bluetooth, a ZigBee, a Near Field Communication (NFC), or the like, or any combination thereof. In some embodiments, any two of the modules may be combined as a single module, and any one of the modules may be divided into two or more units.

Figure 3:
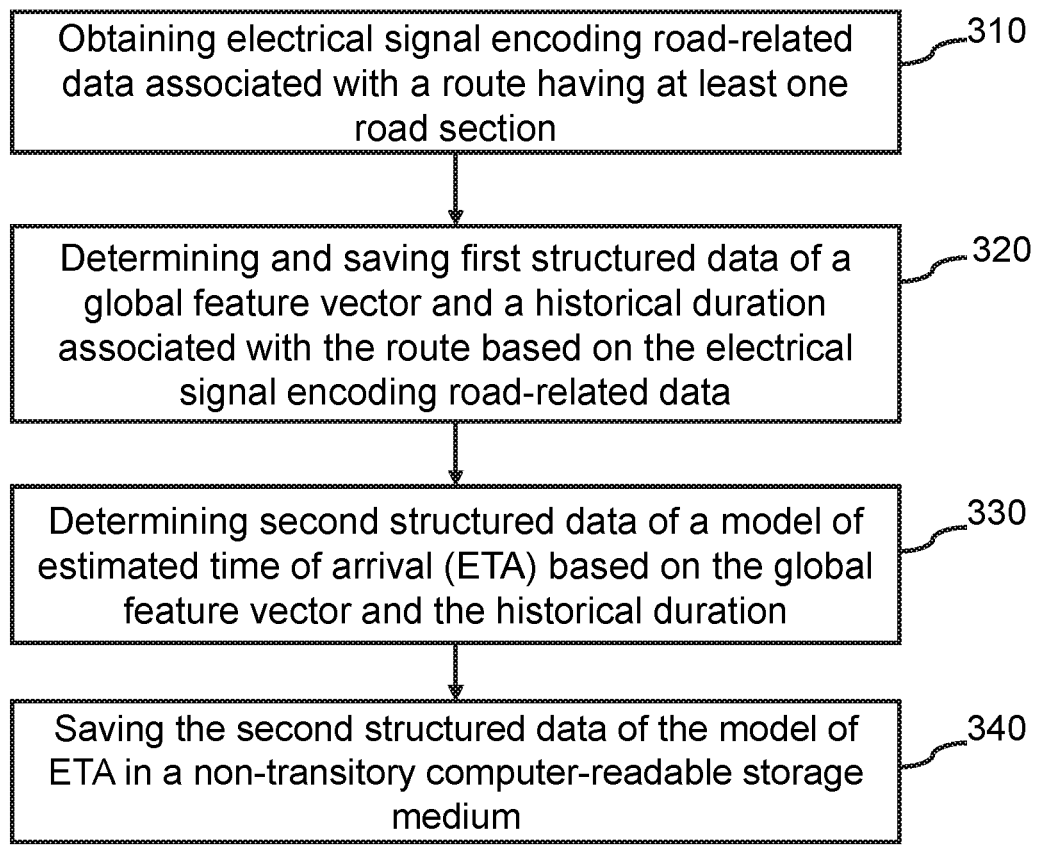
FIG. 3 is a flowchart illustrating an exemplary process and/or method for determining an ETA for a transportation service according to some embodiments of the present disclosure.

FIG. 3 is a flowchart illustrating an exemplary process and/or method 300 for determining an ETA for a transportation service, according to some embodiments of the present disclosure. The process and/or method 300 may be executed by the online on-demand service system 100. For example, the process and/or method 300 may be implemented as a set of instructions (e.g., an application) stored in database 160. The processing engine 112 may execute the set of instructions and may accordingly be directed to perform the process and/or method 300 in an online on-demand service platform. The platform may be an Internet-based platform that connects on-demand service providers and requestors through Internet.

In step 310, the processing engine 112 may obtain road-related data associated with the route. In some embodiments, the road-related data may be encoded by the processing engine 112 using an electrical signal. The route may have at least one road section. The road sections may be divided based on, or at least in part, levels of road, traffic lights, cities, provinces, countries, geographical conditions, traffic identification that related to the road or the route, or the like, or any combination thereof. For example, the road sections may be divided based on the levels of road. The levels of road may include a first-class highway, a second-class highway, a third-class highway, sections of local roads, or the like, or any combination thereof.

As another example, the road sections may be divided based on the traffic lights and/or highway exits etc. Accordingly, a route may include a first road section, a second road section, a third section, . . . , Nth road section. Tow road sections adjacent to each other may be linked with at least one traffic light.

As still another example, the road sections may be divided based on the geographical conditions. For example, a river, a bridge, a railway, a toll station, or the like, or any combination thereof may be used to divide a road adjacent thereto into two road sections.

In some embodiments, data of a road section may be affected not only by another road section in the same route, but also road section(s) from another route. For example, a road section in a route may be directly or indirectly related to another road section(s) from the same and/or different route(s). For example, a first road-related data associated with one road section (e.g., a car crash occurred in a first road section of a first route) may affect or correlate with a second road-related data associated with another road section (e.g., the traffic of a second road section of a second route). As another example, one single route may include two road sections which may be linked by a traffic light. A traffic accident in a first road section may affect travel speed in a second road section, or a traffic jam (e.g., an accident-caused traffic jam) in the first road section may spread to the second road section subsequently causing a traffic jam in the second road section. As still another example, if a highway includes two opposite routes connected by a green barrier, a vehicle restriction in one road section in the first route may cause a traffic jam in another road section in the second route opposite to the first route.

In some embodiments, the relationship between the road sections and/or routes may be quantized by a function, a parameter, a value, a threshold, a vector, a weight, a constant, or the like, or any combination thereof. Merely by way of example, two road sections adjacent to each other may have a relationship designated with a weight of 0.7-0.9, and two road sections apart from each other may be designated with a weight of 0.1-0.3.

In some embodiments, the processing engine 112 may obtain a plurality of routes according to a map. The map may include a navigation map, a satellite map, an administrative map, a road-based map, a subway-based map, a railway-based map, a terrain map, a highway map, a tourist map, or the like, or any combination thereof. In some embodiments, the map may be integrated, modified, or changed. For example, the navigation map, the satellite map, and a road-based map may be integrated as the modified map. In some embodiments, the processing engine 112 may obtain the plurality of routes according to the map corresponding to a city or a district. For example, the plurality of routes may be obtained according to the map corresponding to New York or Long Island district of New York. As another example, the processing engine 112 may obtain all routes during a time interval according to the map of the U.S. highway system.

In some embodiments, the routes may be affected directly or indirectly with each other. For example, if a snowstorm hit the U.S. west coast, speeds of the plurality of routes in Washington State may be slow down, which may affect speeds of the plurality of routes in Idaho. As another example, a newly built road may affect (e.g., increase traffic condition) of a plurality of routes close to the newly built road.

In some embodiments, the road-related data associated with the route may include request data, order data, transaction data, map data, data of a traffic system, weather-related data, user data, any data measured in the route, or the like, or any combination thereof. In some embodiments, the road-related data may be obtained by quantization. For example, a name of a street may be quantized into a number based on a lookup table that collects names of streets and corresponding numbers. In some embodiments, the road-related data may be analyzed based on, or at least in part, the route. For example, during a national holiday, a city ordinance may place traffic restrictions on ABC Avenue, or alternatively, the ABC Avenue may experience extremely heavy traffic. Accordingly, the processing engine 112 may determine to place a traffic restriction to the ABC Avenue and obtain road-related data corresponding to the traffic restriction in the ABC Avenue. As another example, if the processing engine 112 obtain an ID number of a user (e.g., driver's license No. of a driver and/or social security No. of the driver), the processing engine 112 may obtain user data of the user from a database (e.g., a public security network database that may be established by the Ministry of Public Security) according to the ID number.

The electrical signal encoding road-related data associated with the route may be generated by a driver terminal or a passenger terminal. For example, the electrical signal may be transmitted by a driver terminal implemented by a mobile device 1100; and the electrical signal may be received by the processing engine 112. In some embodiments, the electrical signal may be transmitted via a wired connection or a wired connection. For example, the processing engine 112 may obtain the electrical signal from the database 160 via the network 120.

In step 320, the processing engine 112 may determine structured data of a global feature vector and structured data of historical duration associated with the route based on the road-related data. The structured data of a global feature vector and/or the structured data of historical duration may be constructed or retrieved by the processing engine 112 based on a B-tree, or a hash table. In some embodiments, the structured data may be stored or saved as a form of a data library in the database 160. The global feature vector and the historical durations may be used to generate a plurality of training samples. The plurality of training samples may form a training set that may be used to discover potentially predictive relationships or establish a model for prediction.

In some embodiments, the global feature vector may include a plurality of items or features including, for example, traffic status, driving distance, starting time, starting location, destination location, sequence of satellite positioning sampling points, driving distance on a specified level of road, number of road sections, number of crossroads with traffic lights, number of crossroads without traffic lights, vehicle status, or the like, or any combination thereof. The traffic status may include a real-time road speed, or an estimated road speed. The driving distance may include total distance of the route, or distance in each of the road sections. The starting time may include a time that a passenger has been picked up, or a time that a user (e.g., a driver) has receive or confirm a service request. The starting location may be a location where a passenger was picked up, or a location for a passenger to wait a driver. The sequence of satellite positioning sampling points may be a sequence including vehicle positions. The vehicle positions may be determined by a satellite (e.g., via a GPS system). The driving distance on a specified level of road may be a distance that a vehicle drives on a specified level of road, such as a highway, a local road, a first-class road, a second-class road, a third-class road, etc. The number of road sections may be a total number of the road sections in one route. The vehicle status may include an access status (e.g., availability to accept the service request.) to the transportation service request, a response probability, a preference of a driver, a vehicle type, a current number of passengers in the vehicle, a maximum passenger capacity of the vehicle, a color of the vehicle, a service level of the driver, a current speed of the vehicle, or the like, or any combination thereof.

In some embodiments, the global feature vector may include an overall feature vector. The overall feature vector may be determined from the road sections having a relationship with each other. In some embodiments, the overall feature vector may associate with at least one road section from the same and/or different route(s). For example, the overall feature vector may be determined from the road sections in one single route. As another example, the overall feature vector may be determined from the road sections in two or more routes (e.g., two adjacent routes).

In some embodiments, the overall feature vector may be determined based on all road sections in an area or within a map (e.g., a navigation map). For example, the navigation map be installed in a driver terminal. The navigation map may have, for example, 200 road sections, and the processing engine 112 may determine the overall feature vector from the 200 road sections. In some embodiments, size of the area or the map may be adjusted or modified by a driver, a passenger, or the processing engine 112. For example, the processing engine 112 may obtain road-related data associated with 3500 road sections in an administrative map of Beijing. As another example, the processing engine 112 may select 300 road sections by narrowing the size of administrative map of Beijing into an area of interest. As another example, the processing engine 112 may divide the area or the map into two or more sub-areas (e.g., 10 equal sub-areas). The road sections in each of the sub-areas may be used to determine the overall feature vector. In some embodiments, the processing engine 112 may determine two or more overall feature vectors (e.g., 10 overall feature vectors) according to the sub-areas.

In some embodiments, the global feature vector may be expressed as a vector with one column or one row. For example, the global feature vector may be a row vector expressed as a 1×N determinant (e.g., a 1×25 determinant). As another example, the global feature vector may be a column vector that may be expressed as an N×1 determinant (e.g., a 200×1 determinant). In some embodiments, the global feature vector may correspond to an N-dimensional coordinate system. The N-dimensional coordinate system may be associated with N items or features of the routes. In some embodiments, one or more global feature vectors may be processed by the processing engine 112. For example, three global features vectors (e.g., three row vectors) may be integrated into a 3×N determinant. As another example, N global feature vectors (e.g., N 1×N row vectors) may be integrated into an N×N determinant.

Figure 9:
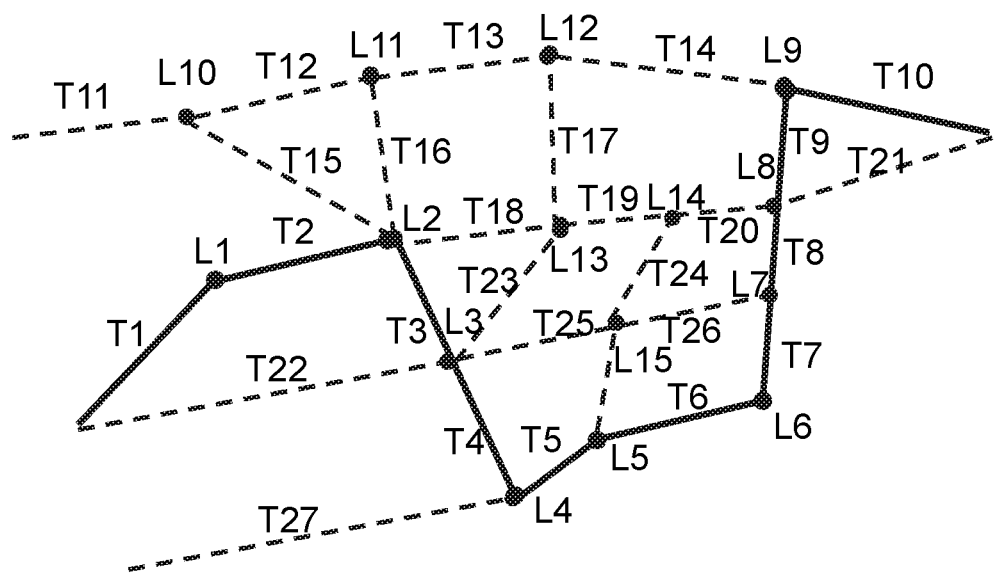
FIG. 9 illustrates exemplary diagrams of a physical model for predicting an ETA according to some embodiments of the present disclosure.

For example, referring to FIG. 9, a route 900 is shown in a road-based map. The route 900 may include 10 road sections (e.g., a first road section, a second road section, . . . , tenth road section) and 9 traffic lights ((e.g., a first traffic light, a second traffic light, . . . , a ninth traffic light). Two adjacent road sections are linked with one or more traffic lights. Time of passing through each of the road sections may be determined based on each of speeds in road sections. For example, the time of passing through the first road section may be determined as T1; the time of passing through the second road section may be determined as T2; . . . ; and the time of passing through the tenth road section may be determined as T10. Time of passing through each of the traffic lights may be determined as L1, L2, . . . , and L9. The processing engine 112 may determine a global feature vector according to the road sections in the route 900. The global feature vector may include road-related data associated with all road sections in the map, for example, the global feature vector may include the road-related data from the first road section to the twenty-seven road section.

The road-related data associated with each road section may include request data, order data, transaction data, map data, data of a traffic system, weather-related data, user data, or the like, or any combination thereof. The global feature vector may further include data representing relationships of road sections in the map. Relationships of road sections may include relationships between any two road sections in the map, or relationships among any three or more road sections in the map. Number of relationships between any two road sections may be a 2-combination of 27. Data representing relationships of road sections in the map may be expressed as a function, a parameter, a value, a threshold, a vector, a weight, a constant, or the like, or any combination thereof. Data representing relationships of road sections may be determined by a formula (e.g., a Pearson product-moment correlation coefficient). In some embodiments, data representing relationships of road sections may be generated based on a matrix with M columns and M rows, where M may be any integer number, representing twenty-seven road section in the map. The matrix may be sparse described as, for example:

$$\begin{bmatrix} 1.0 & 0.0 & 0.1 & \ldots & 0.1 \\ 0.2 & 1.0 & 0.0 & \ldots & 0.0 \\ 0.0 & 0.3 & 1.0 & \ldots & 0.0 \\ \ldots & \ldots & \ldots & \ldots & \ldots \\ 0.0 & 0.0 & 0.0 & \ldots & 1.0 \end{bmatrix} \quad (1)$$

where values in a diagonal line position, for example, the second column and the second row, may be 1. This may represent the second road section has 100% correlation with itself. Values in the first column and the second row may be 0.2, this may represent the second road section has 20% interaction relation with the first road section. Most of values in the matrix may be 0, this may represent the corresponding two road sections are uncorrelated.

In step 330, the processing engine 112 may determine a model of estimated time of arrival (ETA) based on the global feature vector and the historical duration.

In some embodiments, the processing engine 112 may use a machine learning method to determine the model of ETA. In some embodiments, the machine learning method may include a decision tree algorithm, an association rule algorithm, an artificial neural networks algorithm, a deep learning algorithm, an inductive logic programming algorithm, a support vector machines algorithm, a clustering algorithm, a Bayesian networks algorithm, a reinforcement learning algorithm, a representation learning algorithm, a similarity and metric learning algorithm, a sparse dictionary learning algorithm, a genetic algorithms, a rule-based machine learning algorithm, or the like, or any combination thereof.

In some embodiments, the processing engine 112 may use a decision tree algorithm for determining a model of ETA. The decision tree algorithm may include an iterative dichotomiser 3 algorithm, classification and regression tree algorithm, successor of ID3 algorithm, CHi-squared automatic interaction detector algorithm, conditional inference trees algorithm, or the like, or any combination thereof.

In some embodiments, the model of ETA may be saved in a storage medium in forms as structured data. The structured data of a model of ETA may be constructed or retrieved by the processing engine 112 based on a B-tree, or a hash table. In some embodiments, the structured data may be stored or saved as a form of a data library in the database 160.

In step 340, the processing engine 112 may save the structured data of the model of ETA in a non-transitory computer-readable storage medium. In some embodiments, the processing engine 112 may send the structured data of the model of ETA to an electronic device to conduct an ETA for an intended route. The non-transitory computer-readable storage medium may include a universal serial bus flash disk, a hard disk, a solid state disk, a CD ROM, and/or any computer-readable transitory or non-transitory memory. For example, the processing engine 112 may save the structured data of the model of ETA in the hard disk; and a driver terminal may read the hard disk and obtain the structured data of the model of ETA.

The model of ETA may be stored as structured data and implemented as a set of instructions of an application and be installed in the electronic device. The electronic device may include smartphone, personal digital assistant (PDA), tablet computer, laptop, carputer (board computer), play station portable (PSP), smart glasses, smart watch, wearable device, virtual display device, or display enhanced equipment (e.g. Google™ Glass, Oculus Rift, HoloLens, Gear VR, etc.), or the like, or any combination thereof. In some embodiments, the electronic device may be a component of the online on-demand service system 100 (e.g., the database 160). The electronic device may obtain the model of ETA by downloading from any component in the online on-demand service system 100 via the network 120. In some embodiments, the electronic device may obtain the model of ETA from a non-transitory computer-readable storage medium (e.g., a universal serial bus flash disk, a hard disk, a solid state disk, a CD ROM, and/or any computer-readable transitory or non-transitory memory, etc.).

Figure 4:
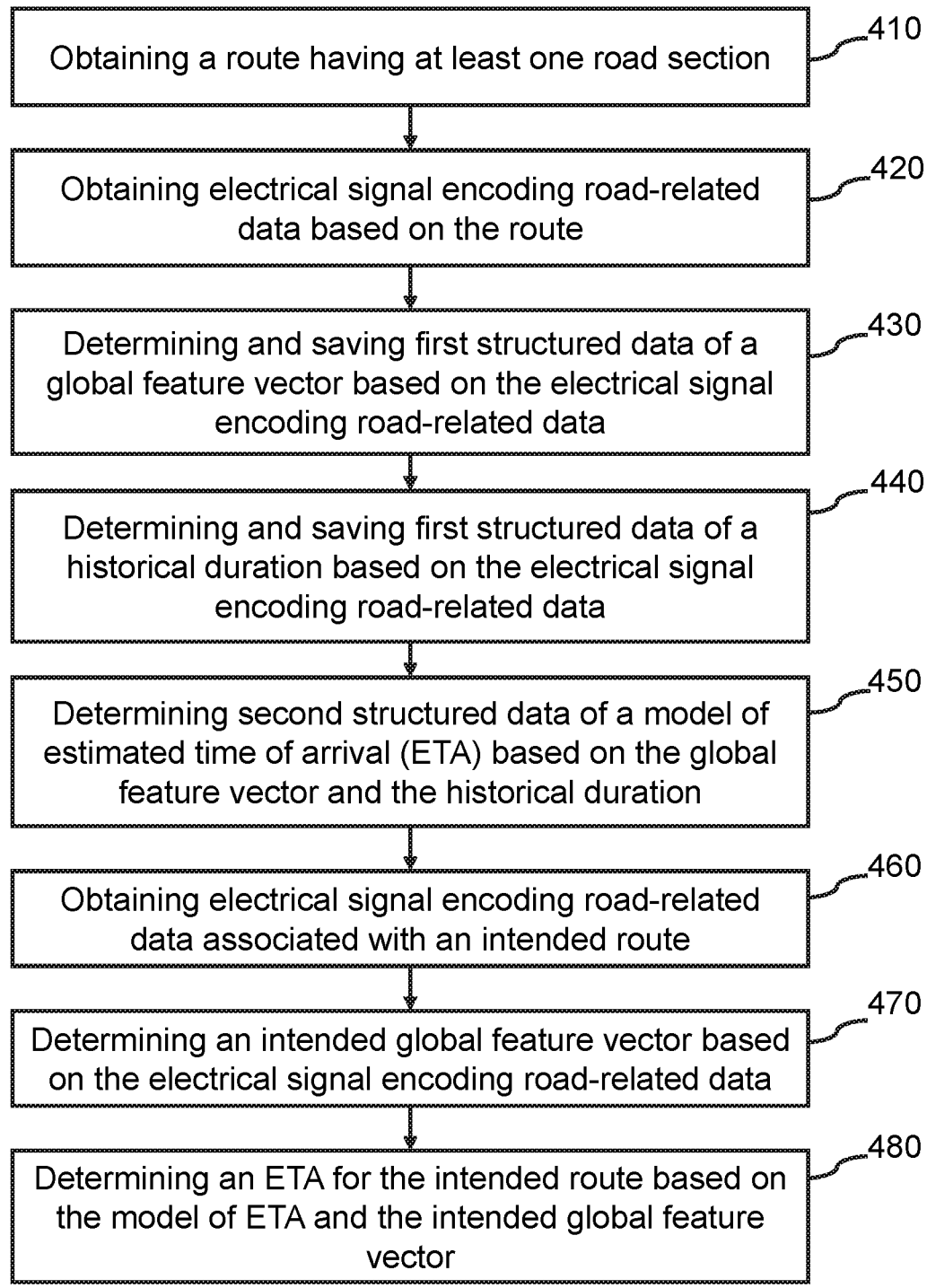
FIG. 4 is a flowchart illustrating an exemplary process and/or method for determining an ETA for an intended route according to some embodiments of the present disclosure.

FIG. 4 is a flowchart illustrating an exemplary process and/or method 400 for determining an ETA for an intended route according to some embodiments of the present disclosure. The process and/or method 400 may be executed by the online on-demand service system 100. For example, the process and/or method 400 may be implemented as a set of instructions (e.g., an application) stored in database 160. The processing engine 112 may execute the set of instructions and may accordingly be directed to perform the process and/or method 400 in an online on-demand service platform via receiving and/or sending electrical signals. The platform may be an Internet-based platform that connects on-demand service providers and requestors through Internet.

In step 410, the processing engine 112 may obtain a route having at least one road section.

In some embodiments, the processing engine 112 may select a road-based map (e.g., a road-based map of Beijing), and obtain the route associated with the road-based map. The route may be recorded by the online on-demand service system 100 during a period (e.g., last three months or last half year). For example, a driver may obtain a service request from the online on-demand service system 100. The service request may be transmitted by a passenger using a passenger terminal. After the service request being confirmed by the driver, the online on-demand service system 100 may start to record road-related data associated with a route that correspond to the service request. In some embodiments, the processing engine 112 may record millions of routes or billions of routes during the period according to the road-based map of Beijing. In some embodiments, any two of routes may be related to each other. For example, an accident in 5th Avenue of New York may block the traffic thereon. To avoid the traffic on the 5th Avenue, an increasing number of drivers may turn from the 5th Avenue to 138th Avenue of New York. As a large number of vehicles run between 5th Avenue and 138th Avenue, routes in all avenues between 5th Avenue and 138th Avenue may come into a heavy traffic status (e.g., a slow speed). In some embodiments, the route may include at least one road section. The plurality road sections may include road sections between two traffic lights, road sections between different levels of roads, road sections linked by a bridge, road sections separated by a river, road sections divided by a railway track, road sections with a fixed distance (e.g., one mile, or two kilometers), road sections among different administrative regions (e.g., different cities, different provinces, or different countries), road sections corresponding to each of pickups of passengers, any road sections with the same or different road properties, or the like, or any combination thereof. For example, the route may include at least one road section (e.g., 50 road sections) with similar road properties. For example, the route may include a section between two traffic lights. The road conditions of the section, such as road width, speed limit, whether condition, etc. may be the same throughout this section. Thus, the section of the route may be described as a single section of the route.

The at least one road section of the route may be directly or indirectly related to each other. For example, if a first road section is linked with a second road section, the first road section may have a relationship with the second road section. Speeds of in the first road section may affect or correlate with the speeds in the second road section. As another example, a road section in a first route may be related to a road section in a second route. If the road section in a first route is close to or near the road section in a second route, a traffic accident in the road section in a first route may affect speeds in the road section in a second route. As still another example, if a large-scale activity (e.g., the Olympic Games or a World Exposition) is hosted in a district or a city, heavy traffic of plurality of road sections in the district or the city may affect speeds of road sections in a nearby district or a nearby city.

In some embodiments, the relationship between the road sections and/or routes may be quantized by a function, a parameter, a value, a threshold, a vector, a weight, a constant, or the like, or any combination thereof. Merely by way of example, two road sections adjacent to each other may have a relationship designated with a weight of 0.7-0.9, and two road sections apart from each other may be designated with a weight of 0.1-0.3.

In step 420, the processing engine 112 may obtain road-related data based on the route having plurality of road sections. In some embodiments, the road-related data may be encoded by the processing engine 112 using an electrical signal.

The processing engine 112 may obtain the road-related data from the database 160 or any component in the online on-demand service system 100. In some embodiments, the road-related data may be obtained from user terminals (e.g., service requestor terminal 130 or service provider terminal 140). For example, the processing engine 112 may obtain the road-related data from driver terminal or passenger terminal by analyzing requests, service requests, transactions, navigation information, electronic map in user terminal, or the like, or any combination thereof.

In step 430, the processing engine 112 may determine a global feature vector based on the electrical signal encoding road-related data. In some embodiments, the processing engine 112 may use the road-related data to construct a data library, a data sheet, a matrix, a sequence, a set, any expression that may organize data, or the like, or any combination thereof. For example, if road-related data is obtained from driver terminals, the processing engine 112 may use the road-related data to generate a sparse matrix including, for example, N columns and N rows. In some embodiments, the sparse matrix may include items or features including, for example, starting location, destination, starting time, waiting time, transaction time, gender, customer comment, driving experience, or the like, or any combination thereof. The processing engine 112 may select one or more items or features from the sparse matrix to determine the global feature vector.

In some embodiments, the processing engine 112 may determine an overall feature vector based on the road-related data. For example, the road-related data associated with all road sections within a navigation map of the driver terminal may be used to determine the overall feature vector. As another example, the road-related data may be associated with at least one road section that may have a relationship with each other. The road-related data associated with the related road sections may be used to determine the overall feature vector. The method or process to determine an overall feature vector may be described as elsewhere according to the present disclosure.

In step 440, the processing engine 112 may determine a historical duration based on the road-related data. The processing engine 112 may directly obtain the historical duration from the road-related data. For example, the processing engine 112 may obtain the historical duration from the database 160. As another example, the processing engine 112 may determine the historical duration by calculating time between a starting time and an ending time. In some embodiments, the historical duration may be corresponding to the global feature vector, and each of global feature vector and its corresponding historical duration may be determined as a training sample during a machine learning. For example, each of global feature vector may be determined as an input, and its corresponding historical may be determined as a label during the machine learning. As another example, millions of global feature vectors and their corresponding millions of historical duration may be used to train a model of ETA.

In some embodiments, the global feature vector and the historical duration may be of a form of structured data. The structured data of a global feature vector and/or the structured data of historical duration may be constructed or retrieved by the processing engine 112 based on a B-tree, or a hash table. In some embodiments, the structured data may be stored or saved as a form of a data library in the database 160.

In step 450, the processing engine 112 may train a model of estimated time of arrival (ETA) based on the global feature vector and the historical duration. In some embodiments, millions of global feature vectors and millions of historical duration may be used to train a model of ETA. The Processing engine 112 may be used to a programming language to implement process of training the model of ETA. The programming language may include C programming language, Java programming language, PHP programming language, JavaScript programming language, C++ programming language, Python programming language, Shell programming language, Ruby programming language, Objective-C programming language, C# programming language, or the like, or any combination thereof. In some embodiments, the process of training the model of ETA may be implemented by a computer software including a matrix laboratory (MATLAB), a RapidMiner, an Orange, an open source computer vision library (OpenCV), a statistical product and service solutions (SPAA), a statistical analysis system (SAS), or the like, or any combination thereof. Each of the computer software (e.g., MATLAB) may include plurality algorithms for training a model.

In some embodiments, the model of ETA may be of a form of structured data. The structured data of a model of ETA may be constructed or retrieved by the processing engine 112 based on a B-tree, or a hash table. In some embodiments, the structured data may be stored or saved as a form of a data library in the database 160.

In step 460, the processing engine 112 may obtain an intended route. The intended route may be corresponding to a request that may be generated by a passenger for a taxi or private car. The online on-demand service system 100 may receive the request and determine the intended route based on the content of the request (e.g., a starting location, a starting time, or a destination, etc.). In some embodiments, the intended route may be obtained from a driver terminal, when a driver confirm or receive a service request from the online on-demand service system 100. In some embodiments, the intended route may be obtained from a passenger terminal, when a passenger establish a request for a transportation service and confirm a service request transmitted from the online on-demand service system 100. In some embodiments, the processing engine 112 may obtain a plurality of intended routes that may correspond to a map (e.g., a road-based map of Beijing), and the plurality of intended routes may be directly or indirectly related to each other. In some embodiments, the intended route may include at least one road section as described elsewhere in the present disclosure, for example, in step 310 and/or step 410.

In step 470, the processing engine 112 may determine an intended global feature vector based on the intended route. In some embodiments, the intended global feature vector may have N dimensions, where the N may correspond to N items or features obtained from the intended route. For example, if the processing engine 112 may select 2000 items or features from the intended route, a vector including 2000 columns or 2000 rows may be determined as an intended global feature vector for the intended route.

In some embodiments, dimensions of the intended global feature vector may be less than that of the global feature vector. If one or more items or features in the intended route is missed, the dimension of the intended global feature vector corresponding to the intended route may decrease, and the intended global feature vector with deceased dimension (e.g., a vector with R columns or R rows, where R may be less than N). In some embodiments, if one or more items or features in the intended route are missed, the processing engine 112 may determine an intended global feature vector still with N columns or N rows; and columns or rows corresponding to the missing items may be described by a default value (e.g., a null).

In step 480, the processing engine 112 may determining an ETA for an intended route based on the model of ETA and the intended global feature vector. The processing engine 112 may determine the intended global feature vector as an input for the model of ETA; and the model of ETA may come into an output according to the input. For example, if a driver send a request for a taxi to the online on-demand service system 100, an intended route with one or more road sections may be determined. The processing engine 112 may determine the intended global feature vector with N dimensions according to the intended route; and the processing engine 112 may further determine the ETA for the intended route by inputting the intended global feature vector into the model of ETA. In some embodiments, the step 480 may be implemented in an electronic device such a smartphone, a personal digital assistant (PDA), a tablet computer, a laptop, a carputer (board computer), a play station portable (PSP), a smart glasses, a smart watch, a wearable devices, a virtual display device, display enhanced equipment (e.g. a Google™ Glass, an Oculus Rift, a HoloLens, or a Gear VR), or the like, or any combination thereof.

Figure 5:
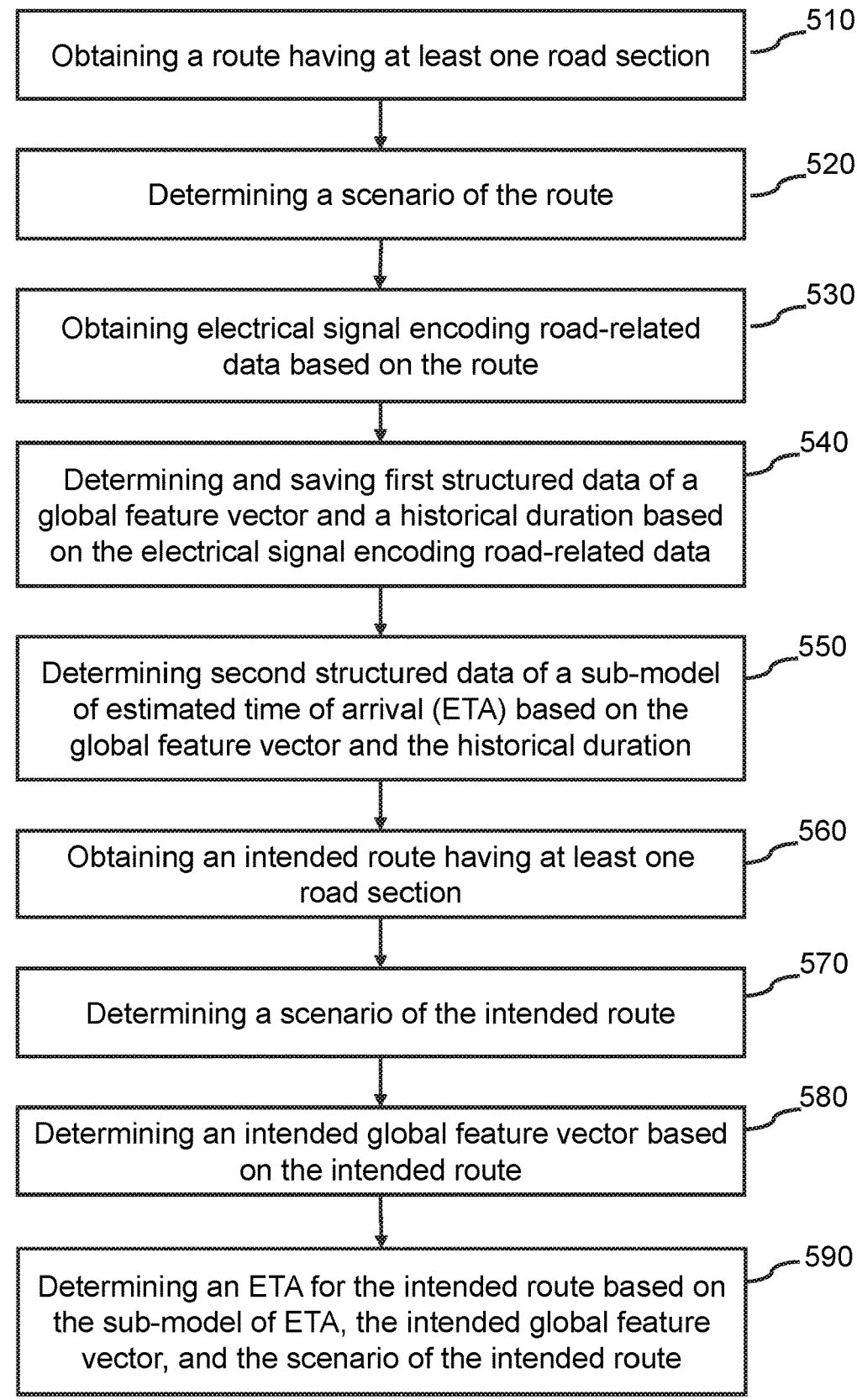
FIG. 5 is a flowchart illustrating an exemplary process and/or method for determining an ETA based on a sub-model of ETA according to some embodiments of the present disclosure.

FIG. 5 is a flowchart illustrating an exemplary process and/or method 500 for determining an ETA for an intended route based on a sub-model of ETA and a scenario of the intended route according to some embodiments of the present disclosure. The process and/or method 500 may be executed by the online on-demand service system 100. For example, the process and/or method 500 may be implemented as a set of instructions (e.g., an application) stored in database 160. The processing engine 112 may execute the set of instructions and may accordingly be directed to perform the process and/or method 500 in an online on-demand service platform. The platform may be an Internet-based platform that connects on-demand service providers and requestors through Internet.

In step 510, the processing engine 112 may obtain a route having at least one road section. More descriptions regarding to the route may be found elsewhere in the present disclosure, for example, in step 310 and/or step 410.

In step 520, the processing engine 112 may determine a scenario of the route based on the route. The scenario may include a region of the route, or a time interval of the route. The region of the route may be determined based in a stating location of the route, a destination of the route, an administrative division the route passing by or passing though, or the like, or any combination thereof. For example, if the processing engine 112 may divide a map in to a region (e.g., a crowded region, a central business district (CBD) region, a region around of a railway station, etc.), a driver associated with the route may pick up a passenger in a starting location; the starting location may be in the CBD region; and the processing engine 112 may determine the scenario of the route as the CBD region. In some embodiments, the processing engine 112 may collect the route with the same or similar scenario (e.g., in the region around of a railway station). For example, the processing engine 112 may obtain routes in the CBD region in past 3 days. As another example, the processing engine 112 may collect routes during a rush time (e.g. 7 a.m. to 9 a.m.).

In step 530, the processing engine 112 may obtain road-related data based on the route with at least one road section. In some embodiments, the road-related data may be encoded by the processing engine 112 using an electrical signal. The processing engine 112 may obtain the road-related data from a user terminal (e.g., a driver terminal, or a passenger terminal) or any component in the online on-demand service system 100. For example, the processing engine 112 may receive the road-related data associated with the routes having the same or similar scenario (e.g., close to Beijing West Railway Station) from driver terminals. For example, the processing engine 112 may obtain the road-related data associated with the routes in a rush time (e.g. 7 a.m. to 9 a.m.) from the database 160.

In step 540, the processing engine 112 may determine a global feature vector and a historical duration based on the road-related data. The global feature vector associated with a route may correspond to the historical duration associated with the same route; each global feature vector in a scenario (e.g., in a CBD region) and corresponding historical duration may be determined as a training sample; and the training sample may be used to form a training set that may be used to determine a sub-model of estimated time of arrival. The training set associated with the same or similar scenario may include hundreds of the training samples, or millions of the training samples.

In some embodiments, the global feature vector and the historical duration may be of the form of structured data. The structured data of a global feature vector and/or the structured data of historical duration may be constructed or retrieved by the processing engine 112 based on a B-tree, or a hash table. In some embodiments, the structured data may be stored or saved as a form of a data library in the database 160.

In step 550, the processing engine 112 may train a sub-model of estimated time of arrival (ETA) based on the global feature vector and the historical duration. The sub-model of ETA may be a model for predicting an ETA for the intended route with the same scenario. The sub-model of ETA may include a decision tree, an association rule, an artificial neural networks, a deep learning, an inductive logic programming, a support vector machines, a clustering, a Bayesian networks, a reinforcement learning, a representation learning, a similarity and metric learning, a sparse dictionary learning, a genetic algorithms, a rule-based machine learning, or the like, or any combination thereof. In some embodiments, the sub-model of ETA may be determined by modifying or updating a model of ETA. In some embodiments, one or more sub-models of ETA may be used to synthesize a model of ETA or a new sub-model of ETA. In some embodiments, at least one sub-model of ETA may be used to predict an ETA for an intended route. For example, a first sub-model of ETA may determine a first ETA for an intended route and a second sub-model of ETA may determine a second ETA for the same intended route. The processing engine 112 may determine a third ETA for the intended route by calculating a mathematics average of the first sub-model of ETA and the second sub-model of ETA. For example, the processing engine 112 may determine a synthesized sub-model of ETA based on a first sub-model of ETA and a second sub-model of ETA. The synthesized sub-model of ETA may be used to determine an ETA.

In some embodiments, the sub-model of ETA may be of the form of structured data. The structured data of a sub-model of ETA may be constructed or retrieved by the processing engine 112 based on a B-tree, or a hash table. In some embodiments, the structured data may be stored or saved as a form of a data library in the database 160.

In step 560, the processing engine 112 may obtain electrical signal encoding road-related data associated with an intended route having at least one road section. The intended route may correspond to or belong to a scenario. For example, a passenger may sent a request for a private car to the online on-demand service system 100. The processing engine 112 may determine the intended route based on the request for a private car; and the processing engine 112 may further determine the scenario of the intended route in step 570.

In some embodiments, the processing engine 112 may determine one or more intended routes with same or different scenario. In some embodiments, the processing engine 112 may determine one or more scenarios for one intended route. For example, if the intended route passed through a CBD region during a rush time (e.g., 7 a.m. to 9 a.m.), the processing engine 112 may determine two scenarios that the intended route may belong to.

In step 580, the processing engine 112 may determine an intended global feature vector based on the intended route. In some embodiments, the intended global feature vector may have N dimensions and may be represent by a vector, where N may be any integer number. The sparse matrix may show N columns or N rows, where the N may correspond to N items or features obtained from the intended route. For example, if the processing engine 112 selects 50 items from the intended route, a vector including 50 columns or 50 rows may be determined as an intended global feature vector for the intended route; and the intended global feature vector may be a vector with 50 dimensions.

In step 590, the processing engine 112 may determine an ETA for an intended route based on the sub-model of ETA, the intended global feature vector and the scenario of intended route. In some embodiments, a passenger may transmit a request for a taxi in rush time to the online on-demand service system 100. The processing engine 112 may determine an intended route and a scenario associated with the intended route; an intended global feature vector may be determined based on the intended route; the processing engine 112 may select a sub-model of ETA that may be trained by a training set associated with a scenario (e.g., in rush time), based on the scenario associated with the intended route; and the processing engine 112 may input the intended global feature vector to the sub-model of ETA to generate an ETA for the intended route in rush time.

In some embodiments, the processing engine 112 may send the ETA to a driver terminal, a passenger terminal, and/or any component of the online on-demand service system 100 (e.g., the database 160). The passenger terminal may display in a user interface to facilitate the passenger to determine whether to confirm a service request. In some embodiments, the ETA may be sent to a driver who may decide whether to select the intended route for a service request (e.g., the driver may drive a taxi according to another route different with the intended route).

Figure 6:
FIG. 6 illustrates exemplary diagrams of a table associated with global feature vector according to some embodiments of the present disclosure.

FIG. 6 illustrates exemplary diagrams of a table associated with a global feature vector according to some embodiments of the present disclosure. The processing engine 112 may obtain road-related data from a driver terminal. In some embodiments, the road-related data may be transmitted as electrical signal. The road-related data may include text data, numeral data, image data, video data, voice data, and/or categorical data. The processing engine 112 may transform the text data, image data, video data, voice data, and categorical data into numeral data. The processing engine 112 may further construct global feature vectors and historical durations based on the numeral data associated with the route. In some embodiments, the processing engine 112 may transform the road-related data after global feature vectors and historical durations have been constructed.

For example, the processing engine 112 may collect road-related data associated with three routes that are denoted 3 route IDs: 1, 2, and 3, respectively (shown as in 610). Each of the road-related data associated with route IDs may include a driving distance 620, a number of traffic light 630, a road width 640, a type of vehicle 650, a driving ranking 660, and a historical duration 670. The processing engine 112 may construct a global feature vector based on each of road-related data. Items or features in the global feature vector may respectively include the driving distance 620, the number of traffic light 630, the road width 640, the type of vehicle 650, and the driving ranking 660. The processing engine 112 may further transform the text data and/or categorical data (e.g., a taxi, or a private car, etc.) in the global feature vector into the numeral data. For example, the taxi and the private car may be transformed in to 1 and 2, respectively. In some embodiments, before training a model of ETA, the processing engine 112 may transform the numeral data in the global feature vector into binary data. The global feature vector may correspond to the historical duration 670. For example, the historical duration may be used as label to train a model. The global feature vector and corresponding historical duration may form a training set. The processing engine 112 may train a model of ETA by determining an input as the global feature vector and determining an output as the corresponding historical duration.

Figure 7:
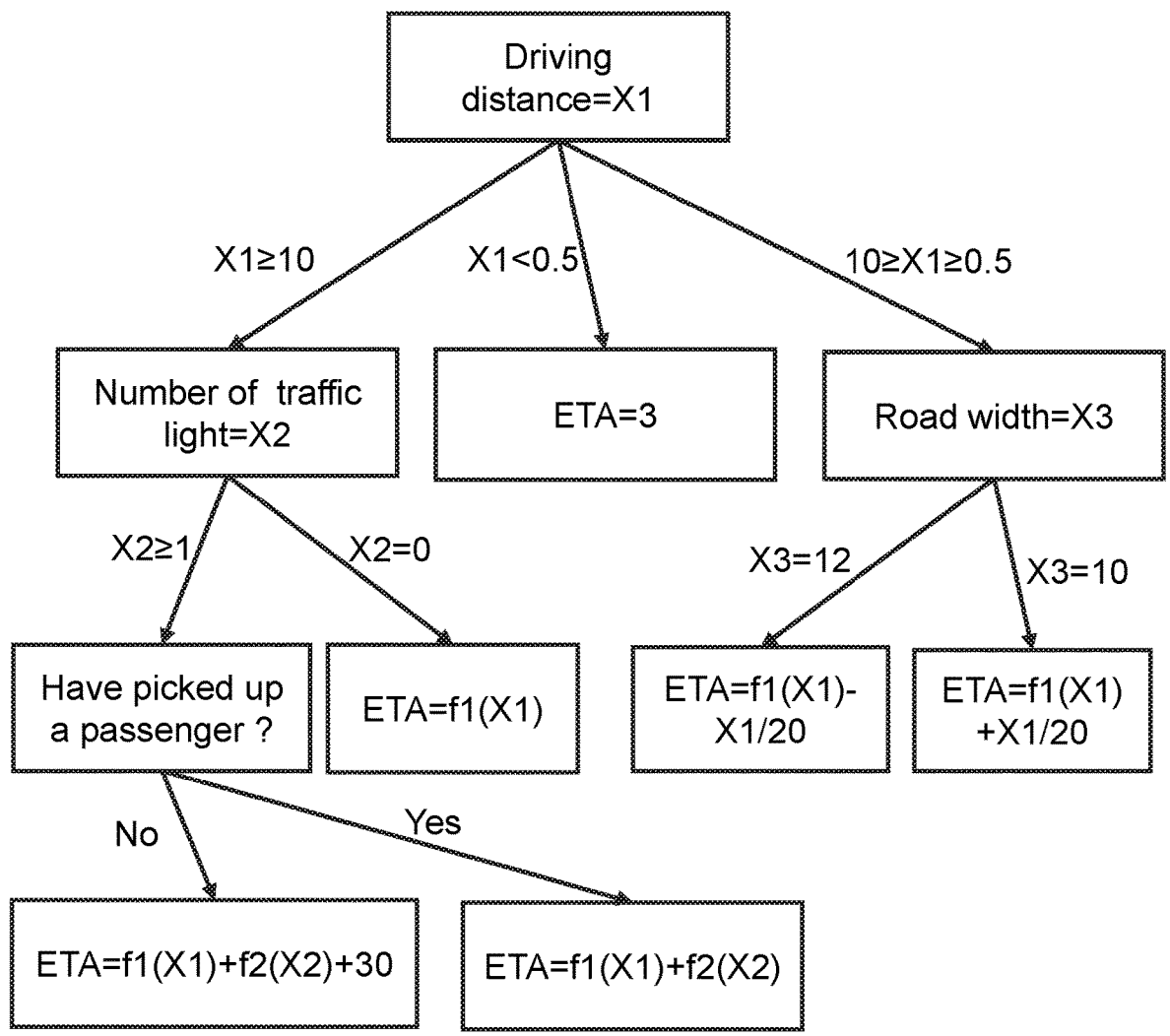
FIG. 7 illustrates exemplary diagrams of a decision tree as model of ETA according to some embodiments of the present disclosure.

FIG. 7 illustrates exemplary diagrams of a decision tree as a model of ETA according to some embodiments of the present disclosure. The decision tree may include a classification tree, a regression tree, or a classification and regression tree. Algorithm used in construct the decision tree may include an iterative dichotomiser 3 algorithm, classification and regression tree algorithm, successor of ID3 algorithm, CHi-squared automatic interaction detector algorithm, or conditional inference trees algorithm. During constructing the decision tree 700, the processing engine 112 may use information gain to determine which variable or item may be decided first in the decision tree 700. The information gain may be expressed as formula (2):

$$\text{Gain} = \text{info}_{beforesplit} - \text{info}_{aftersplit}, \qquad (2)$$

where the Gain represents the gain information; $\text{info}_{beforesplit}$ represents entropy before splitting; and $\text{info}_{aftersplit}$ represents entropy after splitting.

The entropy may be expressed as formula (3):

$$H(T) = \Sigma_{i=1}^{n} P_i \cdot \log_2 P_i, \qquad (3)$$

where H(T) represents entropy for variable T with n values; and $P_i$ represents probability when T is i.

For example, the processing engine 112 may determine information gain for each of variables (e.g., driving distance, number of traffic light, road width, and whether having picked up a passenger); the processing engine 112 may select a variable (e.g., the driving distance) with the largest information gain; and the processing engine 112 may determine the driving distance as a first split to contrast the decision tree 700. Other variables such as the number of traffic light, the road width, and whether having picked up a passenger, may be split based on corresponding information gain respectively. As shown in FIG. 7, the decision tree 700 may be split first using the driving distance. If the driving distance is equal to or greater than 10, the decision tree 700 may be further split by the number of traffic light; if the number of traffic light is equal to or greater than 1, the decision tree 700 may be further split by whether having picked up a passenger; and if a passenger has been picked up, the ETA may be calculated by formula (4):

$$\text{ETA} = f_1(X1) + f_2(X2), \qquad (4)$$

where the $f_1$ represents a function of the driving distance; and the $f_2$ represents a function of the number of traffic light. If the passenger hasn't been picked up, the ETA may be calculated by formula (5):

$$\text{ETA} = f_1(X1) + f_2(X2) + 30, \qquad (5)$$

where the $f_1$ represents a function of the driving distance; and the $f_2$ represents a function of the number of traffic light.

If the driving distance is equal to and greater than 0.5, and equal to and less than 10, the decision tree 700 may be further spit by the road width, for example, if the road width is equal to 12, the ETA may be calculated by formula (6):

$$\text{ETA} = f1(X1) - X1/20, \qquad (6)$$

where the $f_1$ represents a function of the driving distance. If the road width is equal to 12, the ETA may be calculated by formula (7):

$$\text{ETA} = f_1(X1) + X1/20, \qquad (7)$$

where the $f_1$ represents a function of the driving distance.

If the driving distance is less than 0.5, the ETA may be 3 minutes. In some embodiments, the decision tree 700 may output a number based on one of the formula description. For example, the decision tree 700 may output the ETA as 32 minutes based on the formula (7).

Figure 8:
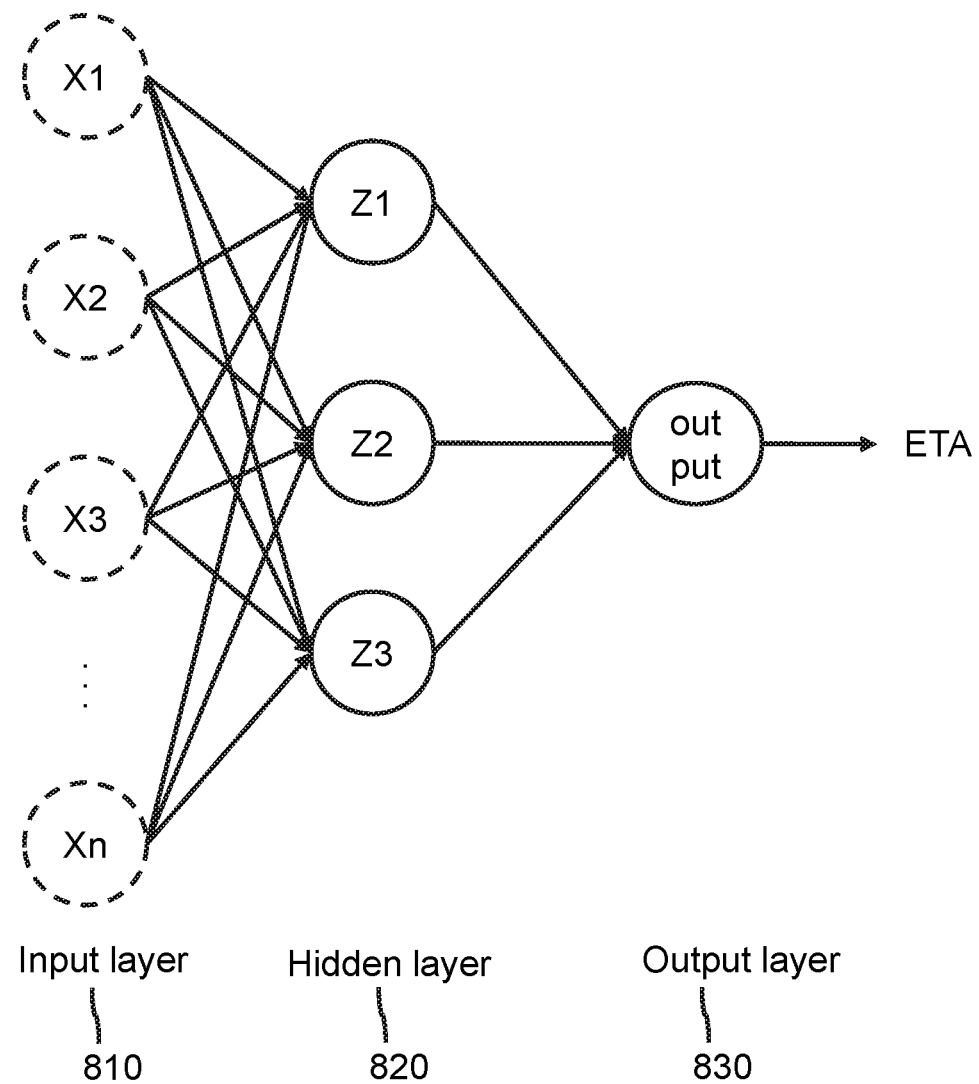
FIG. 8 illustrates exemplary diagrams of an artificial neural network as model of ETA according to some embodiments of the present disclosure.

FIG. 8 illustrates exemplary diagrams of an artificial neural network (ANN) as model of ETA according to some embodiments of the present disclosure. The ANN 800 may include an input layer 810, a hidden layer 820, and an output layer 830. The input layer 810 may consist of one or more artificial neurons that may connect with each other to form a net structure. As shown in FIG. 8, the input layer 810 may include artificial neuron X1, artificial neuron X2, artificial neuron X3, . . . , artificial neuron Xn. In some embodiments, a number of the artificial neurons in the input layer 810 may correspond to the number of the columns of the matrix representing a global feature vector. For example, if the global feature vector corresponding to N items or features is expressed as the vector with N columns or N rows, the number of the artificial neuron in the input layer 810 may be equal to N (e.g., 2000). The hidden layer 820 may include three artificial neurons, artificial neuron Z1, artificial neuron Z2, and artificial neuron Z3. Each of the artificial neurons in the hidden layer 820 may be connected with each of the artificial neurons in the input layer 810; and each of the artificial neurons in the hidden layer 820 may be connected with artificial neuron in the output layer 830. For example, the artificial neuron may connect with artificial neuron X1, artificial neuron X2, artificial neuron X3, . . . , and artificial neuron Xn, respectively. Each of the artificial neuron in the hidden layer 820 may include a summation function. The summation function may be a threshold function or limiting function. For example, the summation function in the hidden layer may be expressed as formula (8):

$$O = f(\Sigma_{j=1}^{n} w_j \cdot x_j - \theta), \qquad (8)$$

where O represents an output of artificial neuron to the artificial neuron in the output layer 830; f represents an activation function; $w_j$ represents weight between the artificial neuron in the hidden layer 820; $x_j$ represents input from artificial neuron $X_j$ in the input layer to the artificial neuron in the hidden layer 820; and θ represents a threshold. The output layer 830 may include at least one artificial neuron. Each of the at least one artificial neuron in the output layer 830 may connect with the each of the artificial neurons in the hidden layer 820. For example, one artificial neuron in the output layer 830 may be connected with artificial neuron Z1, artificial neuron Z2, and artificial neuron Z3, respectively. Each of the artificial neuron in the output layer 830 may also include a summation function such as formula (8). For example, the activation function in the artificial neuron in the output layer 830 may be a step function expressed in formula (9):

$$f(x) = \begin{cases} 1, & \text{if } x \geq 0; \\ 0, & \text{if } x < 0 \end{cases}, \qquad (9)$$

For an example, the activation function may be expressed as a function with a continuous function value (e.g., formula (4)). The artificial neuron with activation function in the output layer 830 may output the ETA for a route or an intended route.

It should be noted that ANN 800 described in FIG. 8 is merely provided for illustration purposes, and not intended to limit the scope of the present disclosure. For persons having ordinary skills in the art, various modifications and changes in the forms and details of the application of the above method and system may occur without departing from the principles in the present disclosure. For example, number of the hidden layer 820 may be two or more. As another example, ANN 800 may further include a convolution layer and/or a pooling layer. The convolution layer and the pooling layer may be alternately arranged in the hidden layer 820. As still another example, ANN 800 may be modified or trained by deep learning methods.

FIG. 9 illustrates exemplary diagrams of a physical model for predicting an ETA according to some embodiments of the present disclosure. The processing engine 112 may obtain a route 900 (shown as in FIG. 9 with continuous line) described in a road-based map. The route 900 includes 10 road sections (e.g., a first road section, a second road section, . . . , and tenth road section) and 9 traffic lights ((e.g., a first traffic light, a second traffic light, . . . , and a ninth traffic light). Two adjacent road sections are linked with one or more traffic lights. Time of passing through each of the road sections may be determined based on each of speeds in road sections. For example, the time of passing through the first road section may be determined as T1; the time of passing through the second road section may be determined as T2; . . . ; and the time of passing through the tenth road section may be determined as T10. Time of passing through each of the traffic lights may be determined as L1, L2, . . . , and L9.

The processing engine 112 may determine the ETA for the route 900 by adding the times of passing through each of the road sections and the times of passing through each of the traffic lights. In some embodiments, the processing engine 112 may determine the ETA for the route 900 based on the road sections in the route 900 and other road sections in the road-based map. The road sections in the route 900 may be directly or indirectly related to other road sections in the road-based map. For example, a road section corresponding to T22 (shown as in FIG. 9 with dotted line) may have a relationship with the road sections (e.g., the first road section) in the route 900; and a speed in the road section corresponding to T22 may affect the speed in the first road section or any other road section in the route 900. In some embodiments, the processing engine 112 may determine a global feature vector based on the road sections in the route and other road sections in the road-based map. The model of ETA trained by the global feature vector may be used to predict the ETA for any route in the road-based map shown as in FIG. 9.

Figure 10:
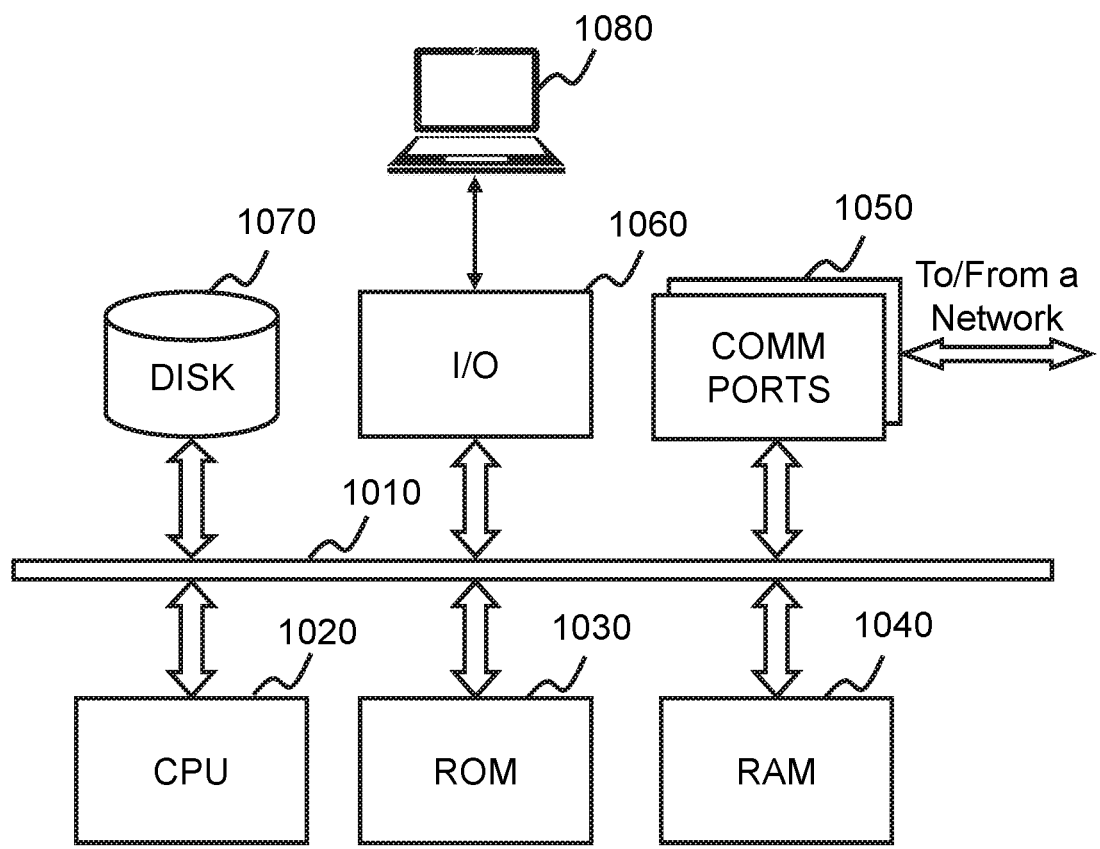
FIG. 10 is a schematic diagram illustrating exemplary hardware and/or software components of a computing device according to some embodiments of the present disclosure.

FIG. 10 is a schematic diagram illustrating exemplary hardware and software components of a computing device 1000 on which the server 110, the service requestor terminal 130, and/or the service provider terminal 140 may be implemented according to some embodiments of the present disclosure. For example, the processing engine 112 may be implemented on the computing device 1000 and configured to perform functions of the processing engine 112 disclosed in this disclosure.

The computing device 1000 may be a general purpose computer or a special purpose computer, both may be used to implement an on-demand system for the present disclosure. The computing device 1000 may be used to implement any component of the on-demand service as described herein. For example, the processing engine 112 may be implemented on the computing device 1000, via its hardware, software program, firmware, or any combination thereof. Although only one such computer is shown, for convenience, the computer functions relating to the on-demand service as described herein may be implemented in a distributed fashion on a number of similar platforms, to distribute the processing load.

The computing device 1000, for example, may include COM ports 1050 connected to and from a network connected thereto to facilitate data communications. The computing device 1000 may also include a central processing unit (CPU) 1020, in the form of one or more processors, for executing program instructions. The exemplary computer platform may include an internal communication bus 1010, program storage and data storage of different forms, for example, a disk 1070, and a read only memory (ROM) 1030, or a random access memory (RAM) 1040, for various data files to be processed and/or transmitted by the computer. The exemplary computer platform may also include program instructions stored in the ROM 1030, RAM 1040, and/or other type of non-transitory storage medium to be executed by the CPU 1020. The methods and/or processes of the present disclosure may be implemented as the program instructions. The computing device 1000 also includes an I/O component 1060, supporting input/output between the computer and other components therein such as user interface elements 1080. The computing device 1000 may also receive programming and data via network communications.

Merely for illustration, only one CPU and/or processor is described in the computing device 1000. However, it should be note that the computing device 1000 in the present disclosure may also include multiple CPUs and/or processors, thus operations and/or method steps that are performed by one CPU and/or processor as described in the present disclosure may also be jointly or separately performed by the multiple CPUs and/or processors. For example, if in the present disclosure the CPU and/or processor of the computing device 1000 executes both step A and step B, it should be understood that step A and step B may also be performed by two different CPUs and/or processors jointly or separately in the computing device 1000 (e.g., the first processor executes step A and the second processor executes step B, or the first and second processors jointly execute steps A and B).

Figure 11:
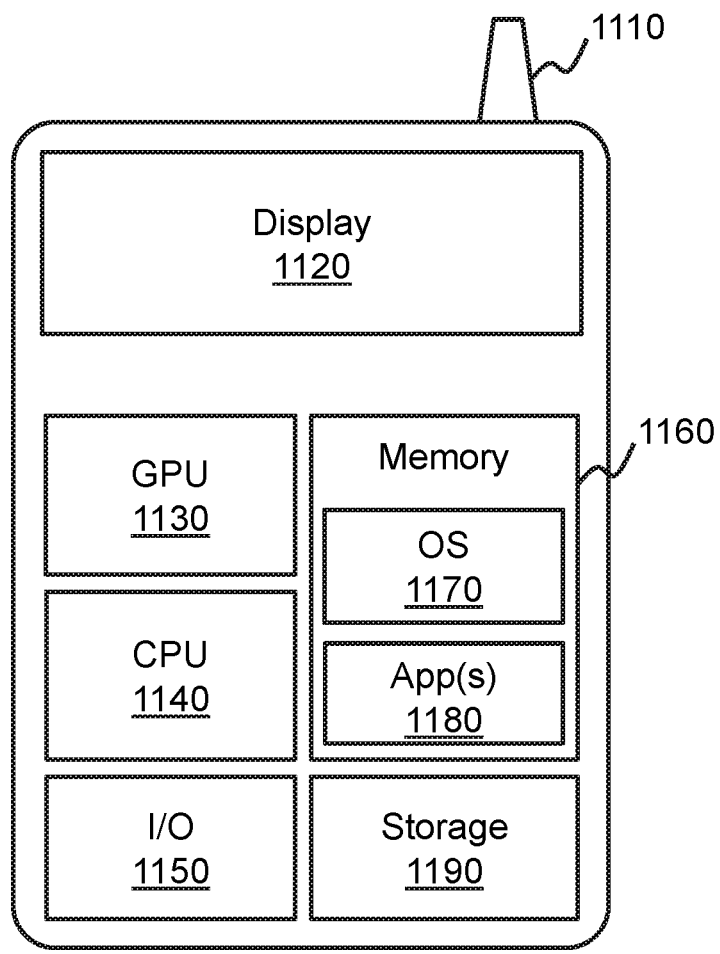
FIG. 11 is a schematic diagram illustrating exemplary hardware and/or software components of an exemplary mobile device on which a user terminal may be implemented according to some embodiments of the present disclosure.

FIG. 11 is a schematic diagram illustrating exemplary hardware and/or software components of an exemplary mobile device 1100 on which a use terminal may be implemented according to some embodiments of the present disclosure. As illustrated in FIG. 11, the mobile device 1100 may include a communication platform 1110, a display 1120, a graphic processing unit (GPU) 1130, a central processing unit (CPU) 1140, an I/O 1150, a memory 1160, and a storage 1190. In some embodiments, any other suitable component, including but not limited to a system bus or a controller (not shown), may also be included in the mobile device 1100. In some embodiments, a mobile operating system 1170 (e.g., iOS™, Android™, Windows Phone™, etc.) and one or more applications 1180 may be loaded into the memory 1160 from the storage 1190 in order to be executed by the CPU 1140. The applications 1180 may include a browser or any other suitable mobile apps for receiving and rendering information relating to image processing or other information from the processing engine 112. User interactions with the information stream may be achieved via the I/O 1150 and provided to the processing engine 112 and/or other components of the online on-demand service system 100 via the network 120.

To implement various modules, units, and their functionalities described in the present disclosure, computer hardware platforms may be used as the hardware platform(s) for one or more of the elements described herein. A computer with user interface elements may be used to implement a personal computer (PC) or any other type of work station or terminal device. A computer may also act as a server if appropriately programmed.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB. NET, Python, or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

We claim:

1. A system configured to operate an online on-demand transportation service, comprising:
   a bus;
   logic circuits electronically connected to at least one storage medium via the bus, wherein during operation, the logic circuits load and execute a set of instructions from the at least one storage medium to:
   receive an electrical signal from the bus, the electrical signal encoding road-related data associated with an intended route having a plurality of road sections;
   generate and save at least one intended global feature vector associated with the intended route based on the electrical signal encoding road-related data;
   retrieve a model of estimated time of arrival (ETA) trained on historic road-related data, using a training process; and
   determine an ETA for the intended route based on the intended global feature vector and the model of ETA.

2. The system of claim 1, wherein the intended route is associated with a service request for an online on-demand transportation service.

3. The system of claim 1, the training process including:
obtaining a first electrical signal encoding the historic road-related data, the first electrical signal being associated with at least one route having a plurality of road sections;
generating and saving first structured data of at least one global feature vector and at least one historical duration associated with the at least one route based on the first electrical signal, the at least one global feature vector incorporating interactions between the plurality of road sections; and
generating second structured data of the model of ETA by training the model based on the at least one global feature vector and the at least one historical duration.

4. The system of claim 3, wherein at least two of the at least one global feature vector are integrated into a determinant.

5. The system of claim 3, wherein the at least one global feature vector includes an overall feature vector, wherein the overall feature vector includes a feature indicating a relationship between at least two of the plurality of road sections.

6. The system of claim 5, wherein the at least two of the plurality of road sections are apart from each other.

7. The system of claim 5, wherein the overall feature vector includes traffic status, the traffic status including a real-time road speed or an estimated road speed.

8. The system of claim 1, wherein the model of ETA includes a plurality of sub-models of ETA, the plurality of sub-models of ETA corresponding to at least one of time interval or region in the map.

9. The system of claim 8, wherein to determine the ETA corresponding to the intended route, the logic circuits further:
determine a time interval of a starting time of the intended route;
select, based on the time interval of the starting time, a sub-model of ETA corresponding to time interval; and
determine the ETA corresponding to the intended route based on the sub-model of ETA.

10. The system of claim 8, wherein to determine the ETA corresponding to the intended route, the logic circuits further:
determine a region of a starting location or an ending location of the intended route;
select, based on the region of the starting location or the ending location, a sub-model of ETA corresponding to the region in the map; and
determine the ETA corresponding to the intended route based on the sub-model of ETA.

11. The system of claim 1, wherein the logic circuits further:
send the ETA corresponding to the intended route to a terminal to be displayed.

12. A method configured to operate an online on-demand transportation service on at least one electronic device having logic circuits, at least one storage medium, and a communication platform connected to a network, the method comprising:
receiving, by the logic circuits, an electrical signal encoding road-related data associated with an intended route having a plurality of road sections;
generating and saving, by the logic circuits, at least one intended global feature vector associated with the intended route based on the electrical signal encoding road-related data;
retrieving a model of estimated time of arrival (ETA) trained on historic road-related data, using a training process; and
determining an ETA for the intended route based on the intended global feature vector and the model of ETA.

13. The method of claim 12, wherein the intended route is associated with a service request for an online on-demand transportation service.

14. The method of claim 12, the training process including:
obtaining a first electrical signal encoding the historic road-related data, the first electrical signal being associated with at least one route having a plurality of road sections;
generating and saving first structured data of at least one global feature vector and at least one historical duration associated with the at least one route based on the first electrical signal, the at least one global feature vector incorporating interactions between the plurality of road sections; and
generating second structured data of the model of ETA by training the model based on the at least one global feature vector and the at least one historical duration.

15. The method of claim 14, wherein at least two of the at least one global feature vector are integrated into a determinant.

16. The method of claim 14, wherein the at least one global feature vector includes an overall feature vector, wherein the overall feature vector includes a feature indicating a relationship between at least two of the plurality of road sections.

17. The method of claim 16, wherein the at least two of the plurality of road sections are apart from each other.

18. The method of claim 16, wherein the overall feature vector includes traffic status, the traffic status including a real-time road speed or an estimated road speed.

19. The method of claim 12, wherein the model of ETA includes a plurality of sub-models of ETA, the plurality of sub-models of ETA corresponding to at least one of time interval or region in the map.

20. The method of claim 19, wherein determining the ETA corresponding to the intended route comprising:
determining, by the logic circuits, a time interval of a starting time of the intended route;
selecting, by the logic circuits, based on the time interval of the starting time, the sub-model of ETA corresponding to time interval; and
determining, by the logic circuits, the ETA corresponding to the intended route based on the sub-model of ETA.

* * * * *